United States Patent
Obata et al.

(10) Patent No.: US 6,233,000 B1
(45) Date of Patent: May 15, 2001

(54) IMAGE FORMING SYSTEM HAVING AN IMPROVED IMAGING DATA GENERATOR

(75) Inventors: Masahito Obata, Chiba; Makoto Ide, Kanagawa, both of (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 09/392,726

(22) Filed: Sep. 9, 1999

(30) Foreign Application Priority Data

Sep. 14, 1998 (JP) .................................................. 10-260079

(51) Int. Cl.[7] .................................. B41J 2/47; G06K 9/48
(52) U.S. Cl. .......................... 347/254; 347/240; 347/251; 382/199
(58) Field of Search ..................................... 347/240, 251, 347/252, 254; 358/448, 456, 443, 298; 382/181, 199, 208, 217, 254, 266

(56) References Cited

U.S. PATENT DOCUMENTS

| | | | | |
|---|---|---|---|---|
| 5,005,139 | * | 4/1991 | Tung | 382/254 |
| 5,982,508 | * | 11/1999 | Kashihara | 358/456 |
| 5,995,660 | * | 11/1999 | Andoh et al. | 382/181 |

FOREIGN PATENT DOCUMENTS

| | | |
|---|---|---|
| 5-75816 | 3/1993 | (JP) . |
| 5-276382 | 10/1993 | (JP) . |
| 6-89338 | 3/1994 | (JP) . |
| 9-300698 | 11/1997 | (JP) . |

\* cited by examiner

*Primary Examiner*—N. Le
*Assistant Examiner*—Hai C. Pham
(74) *Attorney, Agent, or Firm*—Oblon, Spivak, McClelland, Maier & Neustadt, P.C.

(57) ABSTRACT

An image forming system includes an imaging data generator which generates a dot intensity data from each of a series of pixels contained in an input image, each pixel having bits indicative of an intensity of the pixel only, the imaging data generator including a plurality of discrimination patterns to detect the presence of a 1-pixel-thick vertical line or a multipixel-thick line edge in the input image. An optical writing unit modulates an emission power and/or an emission time of a laser diode by using the dot intensity data, and determines the emission power of the laser beam per dot based on the dot intensity data, so that the laser diode emits the laser beam to a photoconductive medium in accordance with the modulation data. When an intensity pattern related to a subject pixel and neighboring pixels thereof matches one of the discrimination patterns, the imaging data generator selects a corrected intensity value corresponding to the matched discrimination pattern as the dot intensity data. When the intensity pattern does not match any of the discrimination patterns, the imaging data generator selects the intensity of the subject pixel as the dot intensity data.

16 Claims, 9 Drawing Sheets

{Dc1,Dc2,Dc3}=(0,0,1,1,0,0)   Dd1
{Dc1,Dc2,Dc3}=(0,0,1,0,0,0)   Dd2
{Dc1,Dc2,Dc3}=(1,1,1,1,0,0)   Dd3
{Dc1,Dc2,Dc3}=(0,0,1,1,1,1)   Dd3
{Dc1,Dc2,Dc3}=(1,1,1,0,0,0)   Dd4
{Dc1,Dc2,Dc3}=(0,0,1,0,1,1)   Dd4
{Dc1,Dc2,Dc3}=(X,X,0,0,X,X)   Dd5
{Dc1,Dc2,Dc3}=(X,X,0,1,X,X)   Dd6
{Dc1,Dc2,Dc3}=(X,X,1,0,X,X)   Dd7
{Dc1,Dc2,Dc3}=(X,X,1,1,X,X)   Dd8

{Dc1,Dc2,Dc3}=(0,0,0,1,0,0)
{Dc1,Dc2,Dc3}=(1,1,0,1,0,0)
{Dc1,Dc2,Dc3}=(0,0,0,1,1,1)
{Dc1,Dc2,Dc3}=(1,1,0,1,1,1)

FIG.14A
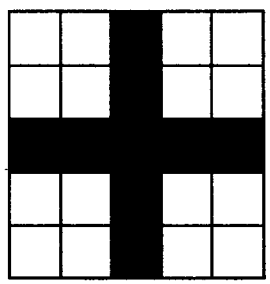
FIG.14B
| 0 | 0 | 11 | 0 | 0 |
|---|---|----|---|---|
| 0 | 0 | 11 | 0 | 0 |
| 11| 11| 11 | 11| 11|
| 0 | 0 | 11 | 0 | 0 |
| 0 | 0 | 11 | 0 | 0 |
FIG.14C
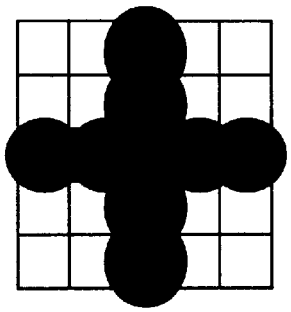
FIG.14D
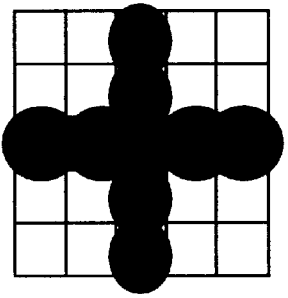
FIG.15A
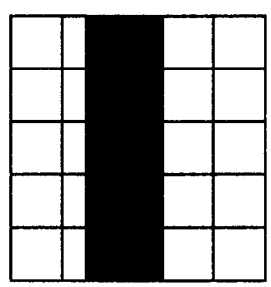
FIG.15B
| 0 | 10 | 11 | 0 | 0 |
|---|----|----|---|---|
| 0 | 10 | 11 | 0 | 0 |
| 0 | 10 | 11 | 0 | 0 |
| 0 | 10 | 11 | 0 | 0 |
| 0 | 10 | 11 | 0 | 0 |
FIG.15C
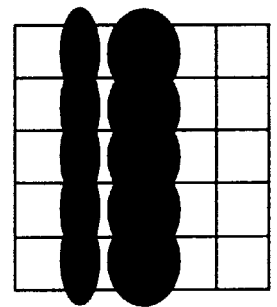
FIG.15D
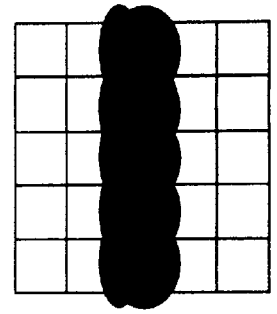

IMAGE FORMING SYSTEM HAVING AN IMPROVED IMAGING DATA GENERATOR

BACKGROUND OF THE INVENTION (1) Field of the Invention

The present invention relates to an image forming system, such as a digital copier or a laser printer, which has an imaging data generator to generate a dot intensity data that is used to modulate an emission power and/or an emission time of a laser diode, so that the laser diode emits a laser beam to a photoconductive medium in accordance with the modulation data. In the image forming system, an electrostatic image is formed on the photoconductive medium by exposing the photoconductive medium to the laser beam, and then a multi-level image is created on the copy sheet from the electrostatic image through a known electrophotographic process.

(2) Description of the Related Art

An image forming system of an electrophotographic type, such as a digital copier or a laser printer, scans a laser beam across an electrostatically charged photoconductive drum while the drum rotates. The areas hit by the laser beam lose their charge, and the electrostatic charge remains only where the copy is to be white. A powdered toner electrostatically adheres to the discharged areas of the photoconductive drum, and is then transferred to the copy sheet to create an image thereon. This process may be called negative/positive (N/P) process, and many image forming systems utilize this N/P process to form an image on the copy sheet.

In a conventional image forming system of the above type, the diameter of the laser beam emitted by the optical writing unit of the image forming system is usually larger than the size of the ideal dot for one pixel. By using the N/P process, the photoconductive drum is scanned by the laser beam and the powdered toner electrostatically adheres to the discharged areas of the photoconductive drum. In such a case, the 1-pixel-thick vertical black line which corresponds to that of the original image may become too broad, and the 1-pixel-thick vertical line is somewhat broader than the 1-pixel-thick horizontal line due to the laser beam profile in the electrophotographic process. Further, the multipixel-thick black line which corresponds to that of the original image may have jaggies at its edges or may be converted into a few 1-pixel-thick black lines separated by a narrow white area. In such a case, the reproductivity or fidelity is degraded. The above problems becomes substantial if the copy image is further reproduced on another copy sheet.

If the imaging conditions of the conventional image forming system using the N/P process are determined so as to fit the 1-pixel-thick vertical line, the 1-pixel-thick horizontal line which corresponds to that of the original image will become too thin. Conversely, if the imaging conditions of the conventional image forming system are determined so as to fit the 1-pixel-thick horizontal line, the 1-pixel-thick vertical line which corresponds to that of the original image will become too broad. There is a difficulty in suitably determining the imaging conditions of the conventional image forming system that achieve good reproductivity of the 1-pixel-thick line.

Japanese Laid-Open Patent Application No.5-75816 discloses an image forming technique aimed at improving reproductivity of a single dot in a two-level image. The image forming technique of the above publication determines a dot intensity of a subject pixel by referring to the intensities of the subject pixel and its neighboring pixels, and it may prevent the occurrence of a too-broad black line or a too-thin white line in the two-level image. However, the image forming technique of the above publication is applied to the improvement of the reproductivity of a dot for a two-level image, and it is difficult to apply this technique to the improvement of the reproductivity of a 1-pixel-thick vertical line or a multipixel-thick-line edge for a multilevel image.

Japanese Laid-Open Patent Application No.6-89338 discloses an image forming technique which determines a phase data (or a start position of the laser beam emission per dot) of a subject pixel by referring to the relation of the intensities of the subject pixel and its neighboring pixels in a multilevel image. It is aimed at achieving good reproductivity of a character or a row of thin lines for a multilevel image. However, it is difficult to apply this technique to the improvement of the reproductivity of a 1-pixel-thick vertical line or a multipixel-thick-line edge for a multilevel image. Also, this technique does not take account of the above problem that the 1-pixel-thick vertical line is broader than the 1-pixel-thick horizontal line in the resulting multilevel image.

SUMMARY OF THE INVENTION

An object of the present invention is to provide an improved image forming system in which the above-described problems are eliminated.

Another object of the present invention is to provide an image forming system which achieves good reproductivity or fidelity of a 1-pixel-thick vertical line or a multipixel-thick-line edge for a resulting multilevel image by using the hardware having a simple structure, and prevents the occurrence of a too-broad black line or a too-narrow white line in the multilevel image.

The above-mentioned objects of the present invention are achieved by an image forming system which forms an electrostatic image on a photoconductive medium by scanning a laser beam across the photoconductive medium in order to create a multilevel image on a copy sheet from the electrostatic image through an electrophotographic process, the image forming system including: an imaging data generator which generates a dot intensity data from each of a series of pixels contained in an input image, each pixel having bits indicative of an intensity of the pixel only, the imaging data generator including a plurality of discrimination patterns to detect the presence of a 1-pixel-thick vertical line or a multipixel-thick line edge in the input image; and an optical writing unit having a laser diode, which modulates an emission power and/or an emission time of the laser diode by using the dot intensity data output by the imaging data generator, and determines the emission power of the laser beam per dot based on the dot intensity data, so that the laser diode emits the laser beam to the photoconductive medium in accordance with the modulation data, wherein corrected intensity values for the dot intensity data are predetermined in correspondence with the individual discrimination patterns, and when an intensity pattern related to a subject pixel and neighboring pixels thereof matches one of the discrimination patterns, the imaging data generator selects a corrected intensity value corresponding to the matched discrimination pattern as the dot intensity data, and when the intensity pattern does not match any of the discrimination patterns, the imaging data generator selects the intensity of the subject pixel as the dot intensity data.

The above-mentioned objects of the present invention are achieved by an image forming system which forms an electrostatic image on a photoconductive medium by scanning a laser beam across the photoconductive medium in order to create a multilevel image on a copy sheet from the electrostatic image through an electrophotographic process, the image forming system including: an imaging data generator which generates a dot intensity data from each of a series of pixels contained in an input image, each pixel having bits indicative of an intensity of the pixel only, the imaging data generator including a plurality of discrimination patterns to detect the presence of a 1-pixel-thick vertical line or a multipixel-thick line edge in the input image; and an optical writing unit having a laser diode, which modulates an emission power and/or an emission time of the laser diode by using the dot intensity data output by the imaging data generator, and determines the emission power of the laser beam per dot based on the dot intensity data, so that the laser diode emits the laser beam to the photoconductive medium in accordance with the modulation data, wherein the imaging data generator includes a pattern detection unit which outputs detection bits by adding a correction bit to the bits indicative of the intensity of a subject pixel in the input image, the correction bit indicating whether or not an intensity pattern related to the subject pixel and neighboring pixels thereof matches one of the discrimination patterns.

In the image forming system of the present invention, when there is a match between the intensity pattern (related to the subject pixel and its neighboring pixels) and one of the plurality of discrimination patterns, the imaging data generator outputs a corrected intensity value to the optical writing unit as the dot intensity data. The image forming system of the present invention can be constructed by using a simple-structure hardware, and it is effective in achieving good reproductivity of a 1-pixel-thick vertical line for a resulting multilevel image. It is possible for the image forming system of the present invention to prevent the occurrence of a too-broad black line in the multilevel image as in the conventional image forming system.

Further, in the image forming system of the present invention, when there is a match between the intensity pattern and one of the plurality of discrimination patterns, the imaging data generator outputs the corrected phase data (the right-aligned mode) to the optical writing unit. In this case, the right-aligned mode is selected at the optical writing unit for the subject pixel, and the laser beam emission by the laser diode with respect to the dot corresponding to the subject pixel is started from the right edge of the dot. When there is no match, the left-aligned mode is selected at the optical writing unit for the subject pixel, and the laser beam emission by the laser diode with respect to the dot corresponding to the subject pixel is started from the left edge of the dot. The image forming system of the present invention can be constructed by using a simple-structure hardware, and it is effective in achieving good reproductivity of a multipixel-thick line edge for a resulting multilevel image.

BRIEF DESCRIPTION OF THE DRAWINGS

Other objects, features and advantages of the present invention will become more apparent from the following detailed description when read in conjunction with the accompanying drawings in which:

FIG. 14A through FIG. 14D are diagrams for explaining an operation of the image forming system of the first embodiment;

FIG. 15A through FIG. 15D are diagrams for explaining an operation of the image forming system of the first embodiment;

DETAILED DESCRIPTION OF THE PREFERRED EMBODIMENTS

A description will now be given of the preferred embodiments of the present invention with reference to the accompanying drawings.

Figure 2:
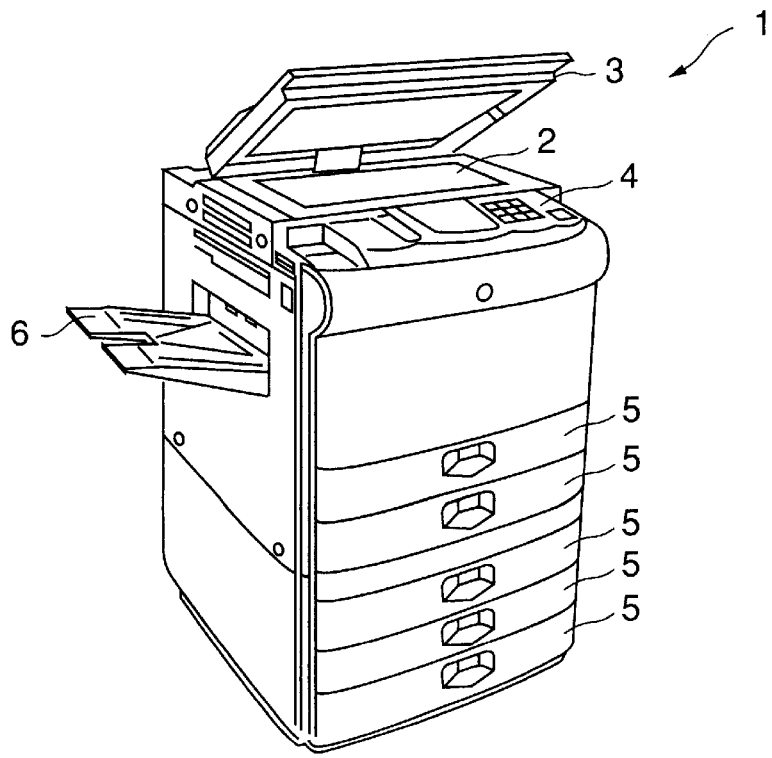
FIG. 2 is a perspective view of a digital copier to which one embodiment of the present invention is applied.

FIG. 2 shows a digital copier 1 to which one embodiment of the present invention is applied. The digital copier 1 of FIG. 2 is an image forming system that carries out the electrophotographic process to create a multilevel image.

As shown in FIG. 2, the digital copier 1 includes a document glass 2 and a cover plate 3 provided at upper portions of the digital copier 1. A document is placed on the document glass 2 and it is held on the document glass 2 by the cover plate 3. In the digital copier 1, a control panel 4 is provided at an upper front portion of the digital copier 1. On the control panel 4, mode-select keys for selecting any of image reading modes, scale-select keys for selecting any of scaling factors, and a display section for indicating operational conditions of the digital copier 1 for the operator are provided. Further, the digital copier 1 includes a sheet feeder section 5 at-a lower portion of the digital copier 1, and a sheet ejection tray 6 at a left-side portion of the digital copier 1.

The digital copier 1 of FIG. 2 is configured similar to the configuration of a known digital copier which generally has a CCD (charge-coupled device) line sensor, a photoconductive drum, a charging device, an optical writing unit with a laser diode and an imaging optical system, a developing device, a sheet transport mechanism, a transferring device, a fixing device and a sheet ejecting device. The digital copier 1 of FIG. 2 also includes these elements, which are essentially the same as those of the known digital copier. In the digital copier 1 of FIG. 2, the electrophotographic process is performed by using these elements, which will be described later.

In the digital copier 1 of FIG. 2, the document is held on the document glass 2 by the cover plate 3, and it is illuminated by light rays of a fluorescent lamp via the document glass 2. An original image on the document is read out at a given resolution (e.g., 600 dots per inch) by photoelectrically sensing the reflection rays from the document by the CCD line sensor, and the CCD line sensor outputs a readout image signal indicating the original image. The image signal output by the CCD line sensor is converted into a digital image signal, and it is processed through several image processing steps. The resulting image signal, after the image processing steps are performed, is supplied to an imaging data generator of the digital copier 1. The imaging data generator generates a dot intensity data based on the supplied image signal. The laser diode of the optical writing unit emits a laser beam in accordance with the dot intensity data output by the imaging data generator. In the optical writing unit, the emission power and/or the emission period of the laser diode per pixel are modulated (the laser power modulation and/or the pulse width modulation) by using the image signal derived from the CCD line sensor. The laser beam emitted by the laser diode is deflected by the imaging optical system to scan the photoconductive drum during the rotation of the drum.

In the digital copier 1 of FIG. 2, the photoconductive drum is electrostatically charged by the charging device while the drum is rotated. The photoconductive drum is exposed to the laser beam of the optical writing unit, which results in selective discharge of the uniform area charge of the photoconductive drum created by the charging device, creating an electrostatic image on the photoconductive drum.

The photoconductive drum is developed at the developing device by bringing electrostatically charged toner particles to the surface of the photoconductive drum where they selectively adhere to appropriately charged areas of the photoconductive drum. The areas hit by the laser beam lose their charge, and the electrostatic charge remains only where the copy is to be blank. In the known negative/positive (N/P) process, the photoconductive drum is discharged in the areas that will be printed black. The digital copier 1 of FIG. 2 uses the N/P process, and the toner particles electrostatically adheres to the discharged areas of the photoconductive drum.

In the digital copier 1 of FIG. 2, a copy sheet is transported from the sheet feeder section 5 to the photoconductive drum. The toned image is electrostatically transferred from the photoconductive drum to the copy sheet at the transferring device. The toner is thermally fused to the copy sheet at the fixing device, and then the copy sheet is ejected to the sheet ejection tray 6 by the sheet ejection device.

Figure 1:
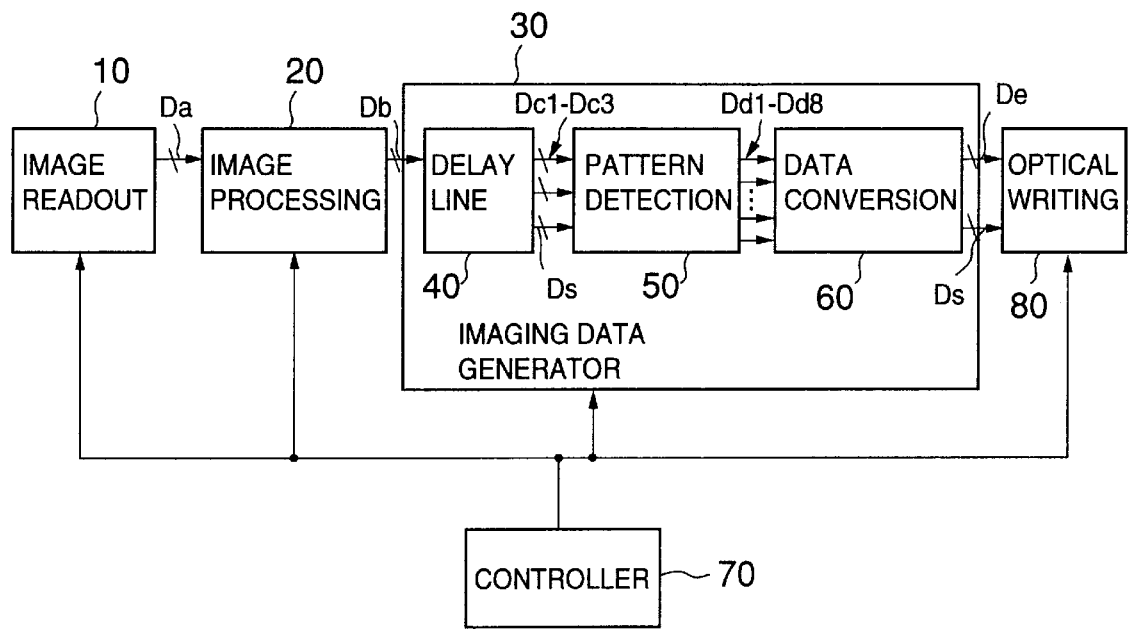
FIG. 1 is a block diagram of an imaging data generator in a first embodiment of an image forming system of the present invention.

FIG. 1 shows the imaging data generator in a first embodiment of the image forming system of the present invention. Suppose that the first embodiment of the image forming system is applied to the digital copier 1 of FIG. 2.

As shown in FIG. 1, an image readout unit 10 is provided in the present embodiment of the image forming system. In the image readout unit 10, the analog image signal output by the CCD line sensor is converted into a digital image signal. The original image is read out at the 600-dpi resolution by photo-electrically sensing the reflection rays from the document by the CCD line sensor, and the CCD line sensor outputs the analog image signal indicating the original image. In the image readout unit 10, the output of the analog-to-digital conversion is 8 bits, and the 8-bit-per-pixel signal is subjected to shading correction and other processing. The image read out unit 10 outputs a digital image signal Da to an image processing unit 20. The image signal Da contains a series of pixels, each pixel having 8 bits. Each of the pixels contained in the image signal Da indicates one of 256 intensities.

In the image processing unit 20, the image signal Da is subjected to MTF (modulation transfer function) correction, scaling processing and other image quality correction steps. After these image processing is performed, the image processing unit 20 outputs a digital image signal Db to the imaging data generator 30. The image signal Db contains a series of pixels, each pixel having 2-bits. Each of the pixels contained in the image signal Db indicates one of 4 intensities: white, gray level 1, gray level 2 and black.

In the present embodiment of the image forming system of FIG. 1, it is assumed that the digital image signal Db, output from the image processing unit 20 to the imaging data generator 30, includes only the intensity data and includes no phase data (or the start position of the laser beam emission per dot). As shown in FIG. 1, the imaging data generator 30 generates a dot intensity data De and a phase data Ds based on the image signal Db, and outputs the dot intensity data De and the phase data Ds to an optical writing unit 80. In the optical writing unit 80, the dot intensity data De output from the imaging data generator 30 is used to modulate the emission power and/or the emission period of the laser beam per dot (the laser power modulation and/or the pulse width modulation). In the digital copier 1, an electrostatic image is formed on the photoconductive drum by exposing the photoconductive drum to the laser beam emitted by the laser diode of the optical writing unit 80, and through the electrophotographic process, a multilevel image is created on the copy sheet from the electrostatic image.

As shown in FIG. 1, the imaging data generator 30 includes a delay line 40, a pattern detection unit 50 and a data conversion unit 60. The digital image signal Db (each pixel having 2 bits) output by the image processing unit 20 is supplied to the delay line 40. By delaying the image signal Db along a main scan line, the delay line 40 outputs the intensities of a left neighboring pixel Dc1, a subject pixel Dc2 and a right neighboring pixel Dc3, which are arrayed along the main scan line, to the pattern detection unit 50.

The pattern detection unit 50 determines whether an intensity pattern related to the subject pixel Dc2 and its neighboring pixels Dc1 and Dc3 matches one of a plurality of line/edge discrimination patterns stored in the pattern detection unit 50. In the present embodiment, the set of line/edge discrimination patterns is to detect the presence of a 1-pixel-thick vertical line or a multipixel-thick line edge in the input image indicated by the image signal Db. Based on the above pattern matching, the pattern detection unit 50 outputs the detection result, which includes detection bits Dd1 through DDT and a phase bit Ds, to the data conversion unit 60.

If there is a match between the input image and the line/edge discrimination patterns as a result of the pattern matching, the detection bits Dd1–DDT, output by the pattern detection unit 50, indicate which of the line/edge discrimination patterns accords with the intensity pattern related to the subject pixel Dc2 and its neighboring pixels Dc1 and Dc3 in the input image. In other words, only one of the detection bits Dd1–DDT corresponding to the matched line/edge discrimination pattern is set to 1 and the other detection bits are set to 0. If there is not any match between them as a result of the pattern matching, the pattern detection unit 50 outputs the detection bits Dd1–DDT that are set to the intensity value of the subject pixel Dc2.

In addition, the phase bit Ds, output by the pattern detection unit 50, indicates whether the right-aligned mode or the left-aligned mode should be selected for the subject pixel Dc2. If the left-aligned mode is selected for the subject pixel, the laser beam emission by the laser diode with respect to the dot (corresponding to the subject pixel) is started from the left edge of the dot, and the laser beam emission for the dot is performed by the laser diode in the forward direction along the main scan line. If the right-aligned mode is selected for the subject pixel, the laser beam emission by the laser diode with respect to the dot (corresponding to the subject pixel) is started from the right edge of the dot, and the laser beam emission for the dot is performed by the laser diode in the reverse direction along the main scan line.

The data conversion unit 60 converts the detection bits Dd1–DDT, output by the pattern detection unit 50, into an 8-bit dot intensity data De, and outputs the dot intensity data De to the optical writing unit 80. At the same time, the data conversion unit 60 outputs the phase data Ds, supplied from the pattern detection unit 50, to the optical writing unit 80 without change.

In the present embodiment of the image forming system shown in FIG. 1, a controller 70 is connected to the control panel 4 of the digital copier 1 of FIG. 2, and the controller 70 controls the image readout unit 10, the image processing unit 20 and the imaging data generator 30 in accordance with the image reading mode and scaling selections of the control panel 4 set by the operator. In the optical writing unit 80, the dot intensity data De and the phase data Ds, output by the imaging data generator 30, are used to modulate the emission power and/or the emission time of the laser diode of the optical writing unit 80 (the laser power modulation and/or the pulse width modulation). The optical writing unit 80 determines the start position of the laser beam emission per dot based on the phase data Ds, and determines the quantity of the emission laser beam per dot based on the dot intensity data De, so that the laser diode emits the laser beam to the photoconductive drum in accordance with the modulation data. In the controller 70, corrected intensity values for the dot intensity data De are predetermined in correspondence with the individual line/edge discrimination patterns held by the pattern detection unit 50. The corrected intensity value corresponding to the matched one of the line/edge discrimination patterns is supplied by the controller 70 and selected by the data conversion unit 60.

Figure 5:
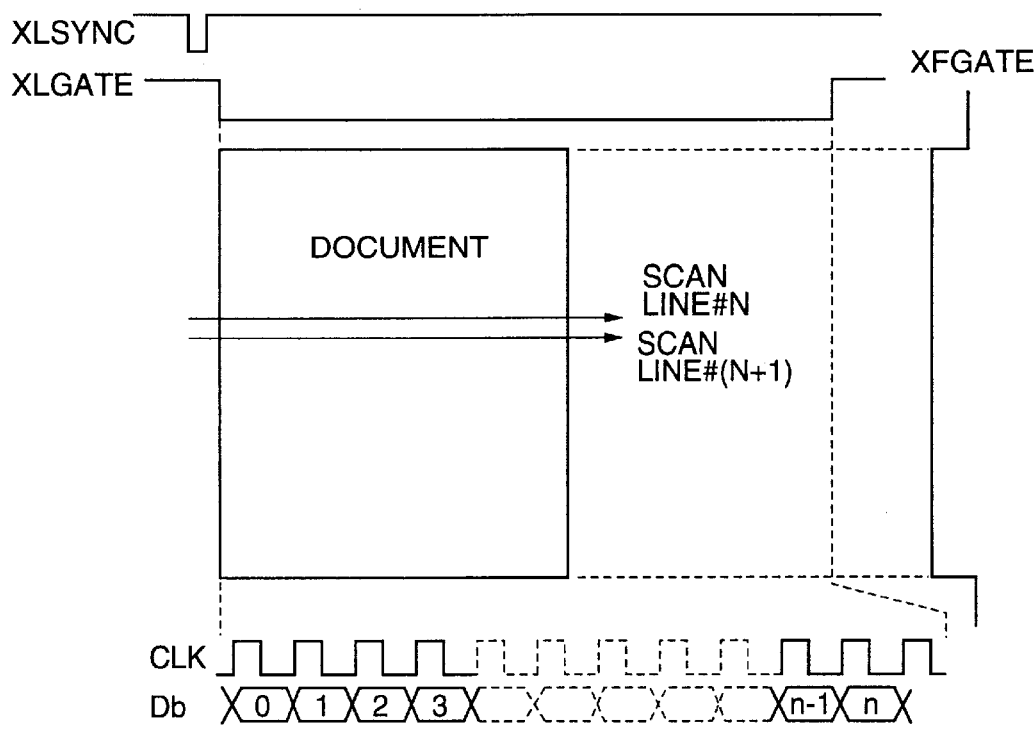
FIG. 5 is a diagram for explaining control signals supplied by a controller to control the imaging data generator.

FIG. 5 shows control signals supplied from the controller 70 to control the imaging data generator 30. As shown in FIG. 5, the imaging data generator 30 is controlled by a main-scan-line sync signal XLSYNC, a main-scan effective period signal XLGATE, a sub-scan effective period signal XFGATE, and a pixel clock CLK. The start timing of the image data along each main-scan line is synchronized by the main-scan-line sync signal XLSYNC. The effective period of the sub-scanning is indicated by the low-level state of the sub-scan effective period signal XFGATE. The effective period of the image data along each main-scan line is indicated by the low-level state of the main-scan effective period signal XLGATE. The respective pixels of the image data (the image signal Db) are supplied from the image processing unit 20 to the imaging data generator 30 in synchronism with the pixel clock CLK.

Figure 3:
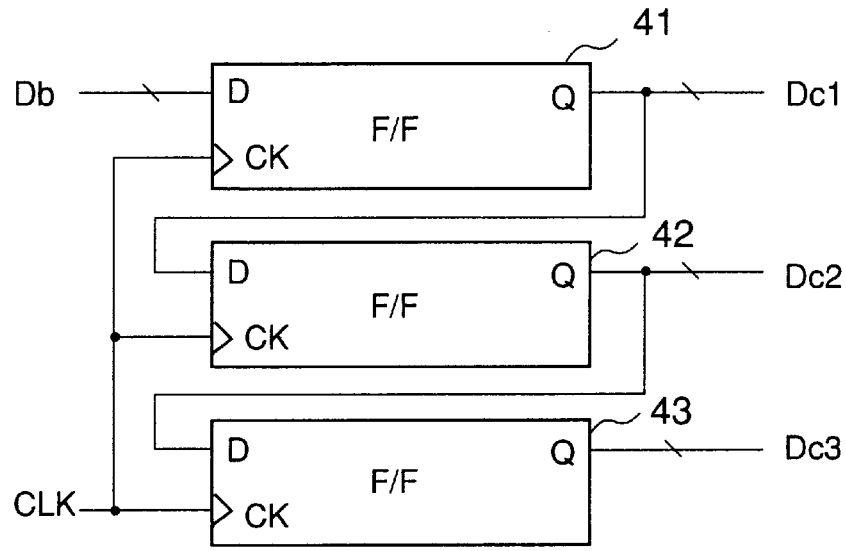
FIG. 3 is a circuit diagram of a delay line in the imaging data generator in the first embodiment.
Figure 4:
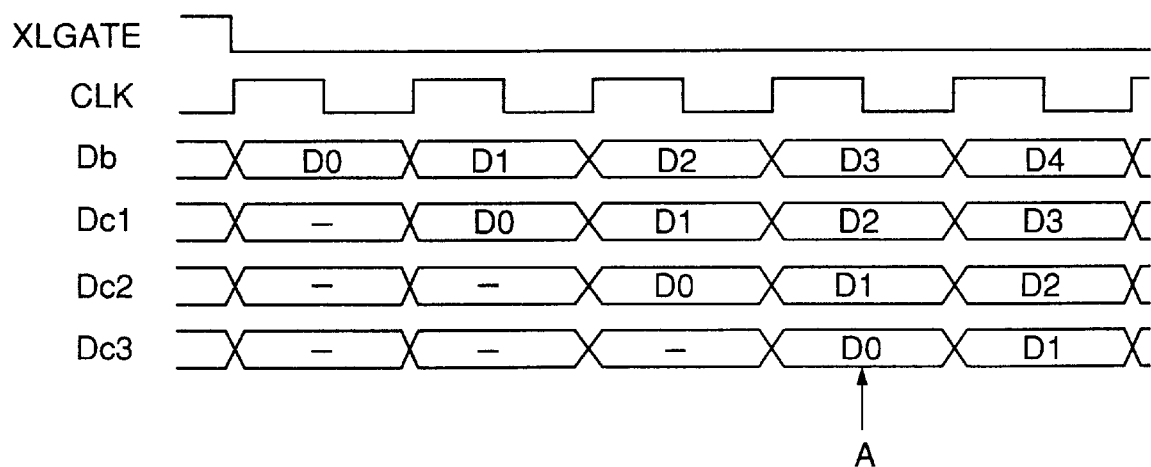
FIG. 4 is a time chart for explaining an operation of the imaging data generator in the first embodiment.

FIG. 3 shows the delay line 40 in the imaging data generator 30 in the first embodiment. FIG. 4 is a time chart for explaining an operation of the delay line 40 of the imaging data generator 30 in the first embodiment.

The delay line 40 of the imaging data generator 30 includes three flipflops (F/F) 41, 42 and 43 which are connected in series as shown in FIG. 3. The image signal Db output by the image processing unit 20 is sequentially supplied to the delay line 40, and by delaying the image signal Db along the main scan line in synchronism with the pixel clock CLK, the delay line 40 outputs the intensities of the three consecutive pixels Dc1–Dc3 to the pattern detection unit 50. Specifically, in synchronism with the common pixel clock CLK, the flipflop 41 outputs the intensity of the left neighboring pixel Dc1, the flipflop 42 outputs the intensity of the subject pixel Dc2, and the flipflop 43 outputs the intensity of the right neighboring pixel Dc3.

As shown in FIG. 4, the image signal Db, containing a series of pixels D0 through Dn (where n is an integer, each pixel having 2 bits) output by the image processing unit 20, is first supplied to the flipflop 41, and the first pixel D0 is latched by the flipflop 41 in accordance with the rising edge of the pixel clock CLK. Each of the flipflops 41–43 acts to delay the image signal Db along the main scan line by one pixel clock.

At the next rising edge of the pixel clock CLK, the second pixel D1 is supplied to the flipflop 41 and latched by the flipflop 41. At the same time as the supply of the second pixel D1, the first pixel D0 is supplied to the flipflop 42 and latched by the flipflop 42. At the further next rising edge of the pixel clock CLK, the third pixel D2 is supplied to the flipflop 41 and latched by the flipflop 41. At the same time, the second pixel D1 is supplied to the flipflop 42 and latched by the flipflop 42, while the first pixel D0 is supplied to the flipflop 43 and latched by the flipflop 43. In this manner, at the timing indicated by the arrow A in FIG. 4, the delay line 40 simultaneously outputs the intensity of the third pixel D2 (or the left neighboring pixel Dc1), the intensity of the second pixel D1 (or the subject pixel Dc2) and the intensity of the first pixel D0 (or the right neighboring pixel Dc3) to the pattern detection unit 50. In the pattern detection unit 50, it is determined whether the intensity pattern related to the subject pixel Dc2 and its neighboring pixels Dc1 and Dc3 matches one of the set of line/edge discrimination patterns.

Figure 6A:
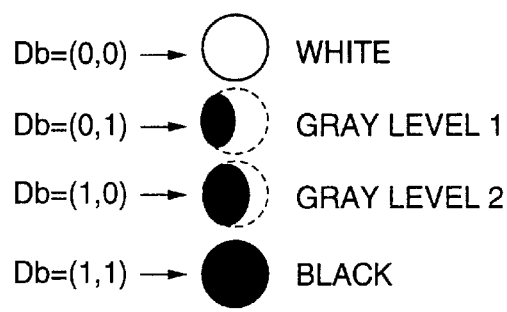
FIG. 6A and FIG. 6B are diagrams for explaining the relationship between intensity data and print dot and the relationship between phase data and print dot.
Figure 6B:
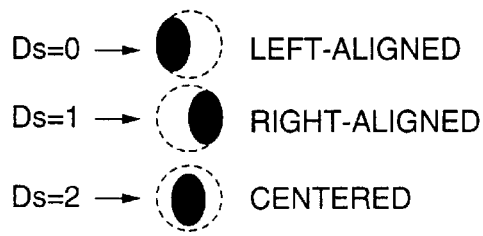

FIG. 6A shows the relationship between intensity data and print dot, and FIG. 6B shows the relationship between phase data and print dot.

As previously described, each pixel contained in the image signal Db, output by the image processing unit 20, has two bits which indicate one of 4 intensities: white, gray level 1, gray level 2 and black. As shown in FIG. 6A, when Db=(0, 0), the print dot is white, when Db=(0, 1), the print dot is at the gray level 1, when Db=(1, 0), the print dot is at the gray level 2, and when Db=(1, 1), the print dot is black. The dot intensity of the gray level 2 is higher than that of the gray level 1.

In the pattern detection unit 50, the phase data Ds is also generated based on the intensity pattern related to the subject pixel Dc2 and its neighboring pixels Dc1 and Dc3. In the present embodiment of the image forming system, the phase data Ds has one bit which indicates either the right-aligned mode or the left-aligned mode. Alternatively, in a variation of the present embodiment, the phase data Ds may have two bits which indicate one of the right-aligned mode, the left-aligned mode and the centered mode. As shown in FIG. 6B, in the present embodiment, when Ds=0 the print dot is created in the left-aligned mode, and when Ds=1 the print dot is created in the right-aligned mode. Further, in the variation of the present embodiment, when Ds=2 the print dot is created in the centered mode as shown in FIG. 6B.

Figure 7:
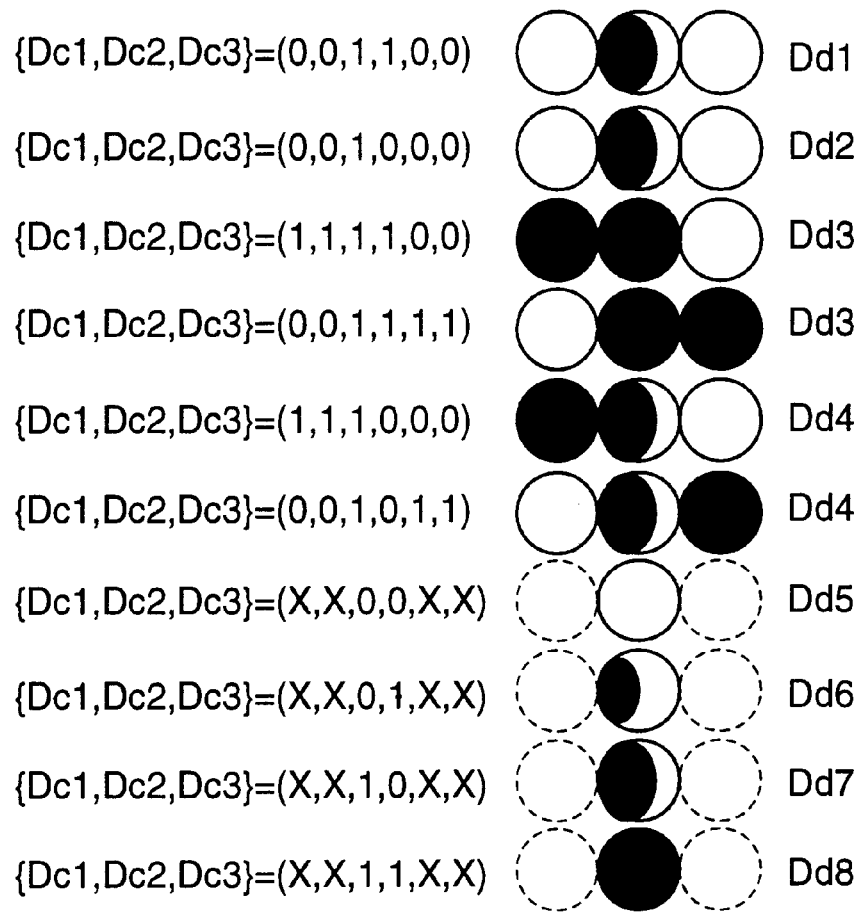
FIG. 7 is a diagram for explaining a plurality of line/edge discrimination patterns held by a pattern detection unit of the imaging data generator in the first embodiment.

FIG. 7 shows a plurality of line/edge discrimination patterns held by the pattern detection unit 50 in the first embodiment.

As each pixel contained in the image signal Db has two bits, the intensity pattern related to the subject pixel and its neighboring pixels, which is output to the pattern detection unit 50, has 64 (=4=4=4) different states. In order to recognize all the 64 different states of the intensity pattern, it is needed for the pattern detection unit 50 to hold 512-bit (=64=8 bits) conversion table for the intensity pattern in the case of the data conversion unit 60 outputting the 8-bit dot intensity data De. The hardware of the pattern detection unit 50 in such a case will have a considerably large size.

To minimize the hardware size, six of the line/edge discrimination patterns held by the pattern detection unit 50 in the present embodiment are configured to meet the requirements: (1) the neighboring pixels Dc1 and Dc3 indicate a white dot or a black dot; and (2) the subject pixel Dc2 indicates a black dot or a gray dot (one of the gray level 1 or the gray level 2). The upper six patterns shown in FIG. 7 are configured to meet these conditions.

Specifically, among the upper six patterns of FIG. 7, the pattern {Dc1,Dc2,Dc3}=(0,0,1,1,0,0) and the pattern {Dc1,Dc2,Dc3}=(0,0,1,0,0,0) are to detect the presence of a 1-pixel-thick vertical line in the input image indicated by the image signal Db. The remaining patterns {Dc1,Dc2,Dc3}= (1,1,1,1,0,0), (0,0,1,1,1,1), (1,1,1,0,0,0) and (0,0,1,0,1,1) are to detect the presence of a multipixel-thick line edge in the input image indicated by the image signal Db.

The lower four patterns shown in FIG. 7 are the patterns {Dc1,Dc2,Dc3}=(X,X,0,0,X,X), (X,X,0,1,X,X), (X,X,1,0,X,X) and (X,X,1,1,X,X) where the bit "X" does not care whether it is 1 or 0 (i.e., the value "1" or the value "0" is allowed for the bit "X"). These patterns are used by the pattern detection unit 50 in the present embodiment so as to cover other states of the intensity pattern (Dc1–Dc3) than those covered by the upper six patterns of FIG. 7. Only the intensity of the subject pixel within the lower four patterns of FIG. 7 is different. The detection bits Dd1–Dd8, indicated on the right side of FIG. 7, are output by the pattern detection unit 50. When there is a match between the input image and the line/edge discrimination patterns as a result of the pattern matching by the pattern detection unit 50, only one of the detection bits Dd1–Dd8 corresponding to the matched one of the line/edge discrimination patterns is set to 1 and the other detection bits remain 0.

In the present embodiment of the image forming system, the data conversion unit 60 converts the detection bits Dd1–Dd8, output by the pattern detection unit 50, into the 8-bit dot intensity data De, and outputs the dot intensity data De to the optical writing unit 80. If there is a match, the value of the dot intensity data De of the subject pixel, corresponding to the black or gray dot forming the 1-pixel-thick vertical line, is reduced to 70–90% of the maximum intensity level by the data conversion unit 60. Therefore, it is adequate for the pattern detection unit 50 to hold at least the line/edge discrimination patterns wherein the neighboring pixels Dc1 and Dc3 indicate a white dot or a black dot and the subject pixel Dc2 indicates a black dot or a gray dot (excluding the case in which the subject pixel Dc2 indicates a white dot).

In the present embodiment of the image forming system, by holding the line/edge discrimination patterns of FIG. 7 in the pattern detection unit 50, it is possible to remarkably reduce the capacity of the conversion table which the pattern detection unit 50 must hold. As previously described, if the above configuration of the pattern detection unit 50 is not used, the pattern detection unit 50 must hold 512-bit conversion table for the intensity pattern (in the case of the data conversion unit 60 outputting the 8-bit dot intensity data De) in order to recognize all the 64 different states of the intensity pattern.

Figure 8:
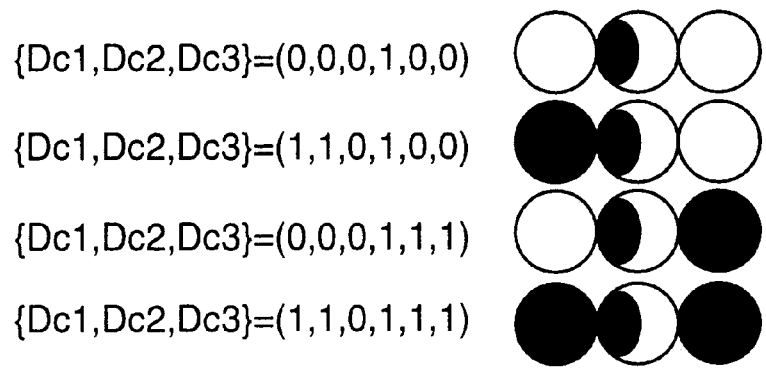
FIG. 8 is a diagram for explaining a plurality of extra line/edge discrimination patterns which may be used by the pattern detection unit.

Alternatively, in a variation of the present embodiment, the pattern detection unit 50 may have extra line/edge discrimination patterns in addition to the line/edge discrimination patterns of FIG. 7, in order to detect the presence of a 1-pixel-thick vertical line or a multipixel-thick line edge in the input image in greater detail. FIG. 8 shows a plurality of extra line/edge discrimination patterns which may be used by the pattern detection unit 50. Among the four extra line/edge discrimination patterns shown in FIG. 8, the first pattern {Dc1,Dc2,Dc3}=(0,0,0,1,0,0) is to detect the presence of a 1-pixel-thick vertical black line with the least thickness in the input image indicated by the image signal Db. The second and third patterns {Dc1,Dc2,Dc3}=(1,1,0, 1,0,0) and (0,0,0,1,1,1) are to detect the presence of a multipixel-thick line edge in the input image indicated by the image signal Db. The last pattern {Dc1,Dc2,Dc3}=(1, 1,0,1,1,1) is to detect the presence of a 1-pixel-thick vertical white line with the least thickness in the input image indicated by the image signal Db.

In the pattern detection unit 50, the phase data Ds is generated based on the intensity pattern related to the subject pixel Dc2 and its neighboring pixels Dc1 and Dc3. In the present embodiment, when Ds=0, the print dot is created in the left-aligned mode, and when Ds=1, the print dot is created in the right-aligned mode. By this configuration of the pattern detection unit 50, it is possible to prevent the occurrence of jaggies at the edges of the multipixel-thick black line which corresponds to that of the original image. Hence, the present embodiment of the image forming system can achieve good reproductivity of a multipixel-thick-line edge for a resulting multilevel image. Further, in a variation of the present embodiment, if there is a match between the intensity pattern of the input image and one of the line/edge discrimination patterns, the phase data Ds is set to 2, and when Ds=2, the print dot is created in the centered mode. In such an embodiment of the image forming system, if the centered mode is selected for the subject pixel, the laser beam emission by the laser diode with respect to the dot (corresponding to the subject pixel) is started from the center of the dot. By this configuration, it is possible to achieve good reproductivity of a 1-pixel-thick line for a resulting multilevel image. In such an embodiment, of the image forming system, the phase data Ds may have two bits which indicate one of the right-aligned mode, the left-aligned mode and the centered mode.

Figure 9:
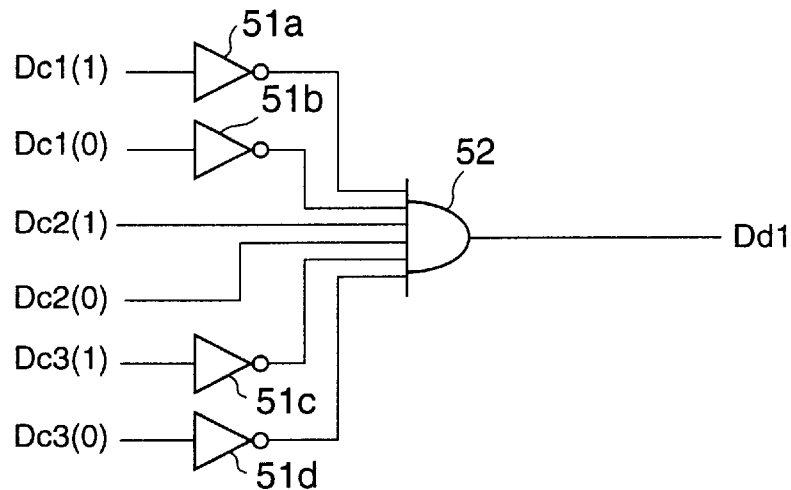
FIG. 9 is a circuit diagram of a portion of the pattern detection unit in the first embodiment.

FIG. 9 shows a portion of the pattern detection unit 50 in the first embodiment which determines whether the intensity pattern matches the first pattern of FIG. 7.

In the image forming system of FIG. 1, the pattern detection unit 50 determines whether the intensity pattern related to the subject pixel Dc2 and its neighboring pixels Dc1 and Dc3 output by the delay line 40 matches one of the set of line/edge discrimination patterns of FIG. 7. The intensity pattern is represented by a series of bit signals Dc1(1), Dc1(0), Dc2(1), Dc2(0), Dc3(1) and Dc3(0) shown in FIG. 9. The pattern detection unit 50 is configured by suitably utilizing inverters, AND gates and OR gates so as to carry out the pattern matching. Based on the pattern matching, the pattern detection unit 50 outputs the detection result, which includes the detection bits Dd1 through Dd8 and the phase bit Ds, to the data conversion unit 60.

As shown in FIG. 9, the portion of the pattern detection unit 50 includes an inverter 51a having an input connected to the bit signal Dc1(1), an inverter 51b having an input connected to the bit signal Dc1(0), an inverter 51c having an input connected to the bit signal Dc3(1), and an inverter 51d having an input connected to the bit signal Dc3(0). The portion of the pattern detection unit 50 further includes an AND gate 52 having inputs connected to the bit signals Dc2(1) and Dc2(0) as well as to the outputs of the inverters 51a–51d. The detection bit signal Dd1 is output by the AND gate 52 based on the intensity pattern related to the subject pixel Dc2 and its neighboring pixels Dc1 and Dc3 output by the delay line 40. The portion of the pattern detection unit 50 of FIG. 9 is configured to determine whether the intensity pattern matches the first pattern (0,0,1,1,0,0) of FIG. 7. When there is a match between the intensity pattern and the first pattern (0,0,1,1,0,0), the detection bit signal Dd1 at the output of the AND gate 52 is set to 1. Otherwise the detection bit signal Dd1 is set to 0.

Similar to the above-described portion of the pattern detection unit 50 of FIG. 9, it is possible to easily configure a portion of the pattern detection unit 50 which determines whether the intensity pattern matches the second pattern (0,0,1,0,0,0) of FIG. 7 by appropriately arranging five inverters and one AND gate. When there is a match between the intensity pattern and the second pattern (0,0,1,0,0,0), the detection bit signal Dd2 at the output of that AND gate is set to 1. As previously described, when there is a match between the input image and the line/edge discrimination patterns as a result of the pattern matching by the pattern detection unit 50, only one of the detection bits Dd1–Dd8 corresponding to the matched one of the line/edge discrimination patterns is set to 1 and the other detection bits remain 0.

Figure 10:
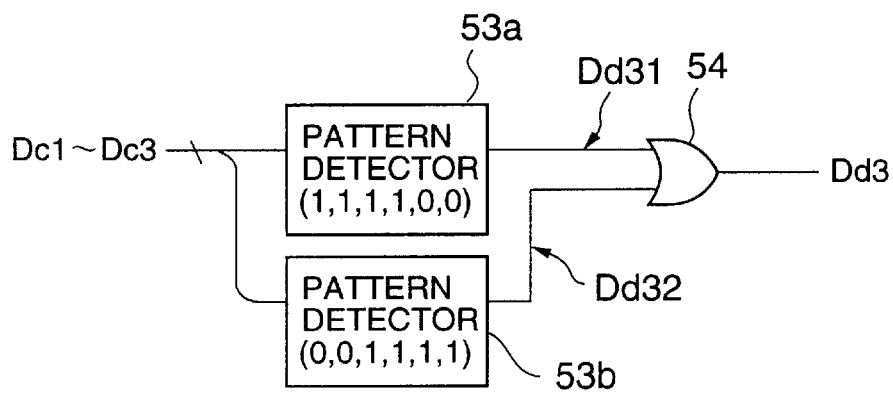
FIG. 10 is a circuit diagram of another portion of the pattern detection unit in the first embodiment.

FIG. 10 shows a portion of the pattern detection unit 50 in the first embodiment which determines whether the intensity pattern matches one of the third pattern or the fourth pattern of FIG. 7.

The detection bit signal Dd3 corresponds to the two patterns (1,1,1,1,0,0) and (0,0,1,1,1,1) of FIG. 7. As shown in FIG. 10, the portion of the pattern detection unit 50 includes a pattern detector 53a having inputs connected to the bit signals Dc1–Dc3, and a pattern detector 53b having inputs connected to the bit signals Dc1–Dc3. The pattern detector 53a outputs a detection signal Dd31 based on the result of pattern matching between the intensity pattern and the third pattern (1,1,1,1,0,0) of FIG. 7. The pattern detector 53b outputs a detection signal Dd32 based on the result of pattern matching between the intensity pattern and the fourth pattern (0,0,1,1,1,1) of FIG. 7. The portion of the pattern detection unit 50 of FIG. 10 further includes an OR gate 54 having inputs connected to the detection signals Dd31 and Dd32 output by the pattern detectors 53a and 53b. The detection bit signal Dd3 is output by the OR gate 54 based on the logical inclusion of the results of the pattern matching executed by the pattern detectors 53a and 53b. The portion of the pattern detection unit 50 of FIG. 10 is configured to determine whether the intensity pattern matches one of the third pattern (1,1,1,1,0,0) or the fourth pattern (0,0,1,1,1,1) of FIG. 7. When there is a match, the detection bit signal Dd3 at the output of the OR gate 54 is set to 1. Otherwise the detection bit signal Dd3 is set to 0.

Similar to the above-described portion of the pattern detection unit 50 of FIG. 10, it is possible to easily configure a portion of the pattern detection unit 50 which determines whether the intensity pattern matches one of the fifth pattern (1,1,1,0,0,0) or the sixth pattern (0,0,1,0,1,1) of FIG. 7 by appropriately arranging two pattern detectors and one OR gate. When there is a match, the detection bit signal Dd4 at the output of that OR gate is set to 1. Otherwise the detection bit signal Dd4 is set to 0.

Figure 12:
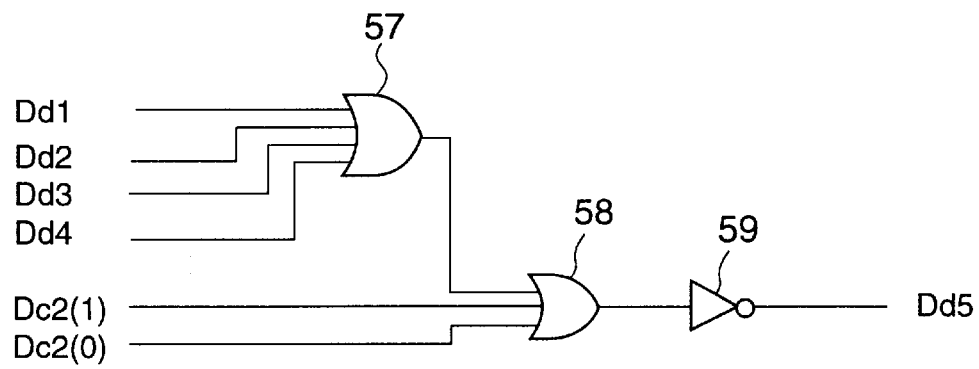
FIG. 12 is a circuit diagram of another portion of the pattern detection unit in the first embodiment.

When the intensity pattern (Dc1,Dc2,Dc3) does not match any of the upper six patterns of FIG. 7, all the detection bit signals Dd1–Dd4 are set to 0. FIG. 12 shows a portion of the pattern detection unit 50 in the first embodiment which determines whether the intensity pattern matches the seventh pattern of FIG. 7. As shown in FIG. 12, the portion of the pattern detection unit 50 includes an OR gate 57 having inputs connected to the detection bit signals Dd1–Dd4, an OR gate 58 having inputs connected to the bit signals Dc2(1) and Dc2(0) as well as to the output of the OR gate 57, and an inverter 59 having an input connected to the output of the OR gate 58.

In the portion of the pattern detection unit 50 of FIG. 12, when the intensity pattern does not match any of the upper six patterns of FIG. 7 and the bit signal Dc2(1) and Dc2(0) (the subject pixel) indicate a white dot (0,0), the detection bit signal Dd5 at the output of the inverter 59 is set to 1. In other words, when there is a match between the intensity pattern and the seventh pattern (X,X,0,0,X,X) of FIG. 7, the detection bit signal Dd5 at the output of the inverter 59 is set to 1. Otherwise the detection bit signal Dd5 is set to 0.

Similar to the portion of the pattern detection unit 50 of FIG. 12, it is easily configure other portions of the pattern detection unit 50 each of which determines whether the intensity pattern matches one of the eighth pattern (X,X,0,1,X,X), the ninth pattern (X,X,1,0,X,X) or the tenth pattern (X,X,1,1,X,X) of FIG. 7. When there is a match, only one of the detection bit signals Dd6–Dd8 at the outputs of the pattern detection unit 50 is set to 1. Otherwise the detection bit signal Dd6–Dd8 are set to 0.

Figure 11:
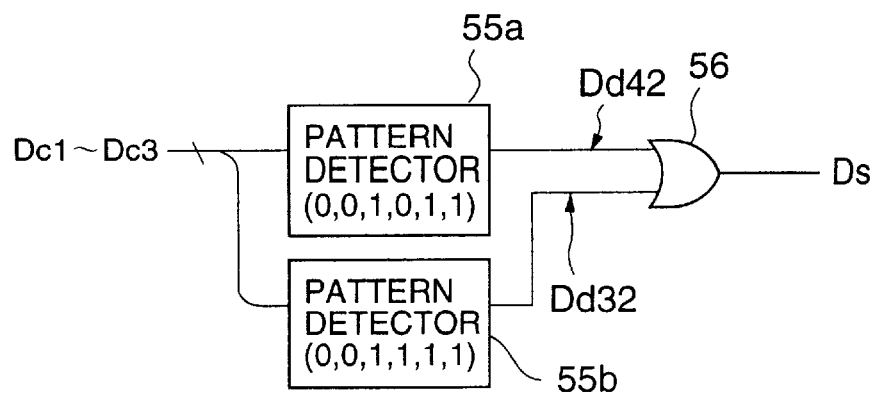
FIG. 11 is a circuit diagram of a further portion of the pattern detection unit in the first embodiment.

FIG. 11 shows a portion of the pattern detection unit 50 in the first embodiment which generates a phase data based on a result of the pattern matching between the intensity pattern (related to the subject pixel Dc2 and its neighboring pixels Dc1 and Dc3) and predetermined ones of the upper six patterns of FIG. 7.

In the present embodiment, a 1-bit phase bit signal Ds is generated by the pattern detection unit 50 based on the intensity pattern of the bit signals Dc1–Dc3 (the subject pixel and its neighboring pixels) output by the delay line 40. When the intensity pattern matches one of the fourth pattern (0,0,1,1,1,1) or the sixth pattern (0,0,1,0,1,1) of FIG. 7, the phase bit signal Ds at the output of the pattern detection unit 50 is set to 1 (the right-aligned mode). Otherwise the phase bit signal Ds is set to 0 (the left-aligned mode).

As shown in FIG. 11, the portion of the pattern detection unit 50 includes a pattern detector 55a having inputs connected to the bit signals Dc1–Dc3, and a pattern detector 55b having inputs connected to the bit signals Dc1–Dc3. The pattern detector 55a outputs a detection signal Dd42 based on the result of pattern matching between the intensity pattern and the sixth pattern (0,0,1,0,1,1) of FIG. 7. The pattern detector 55b outputs the detection signal Dd32 based on the result of pattern matching between the intensity pattern and the fourth pattern (0,0,1,1,1,1) of FIG. 7. The portion of the pattern detection unit 50 of FIG. 11 further includes an OR gate 56 having inputs connected to the detection signals Dd42 and Dd32 output by the pattern detectors 55a and 55b. The phase bit signal Ds is output by the OR gate 56 based on the logical inclusion of the results of the pattern matching executed by the pattern detectors 55a and 55b. The portion of the pattern detection unit 50 of FIG. 11 is configured to determine whether the intensity pattern matches one of the sixth pattern (0,0,1,0,1,1) or the fourth pattern (0,0,1,1,1,1) of FIG. 7. When there is a match, the phase bit signal Ds at the output of the OR gate 56 is set to 1 (the right-aligned mode). Otherwise the phase bit signal Ds is set to 0 (the left-aligned mode).

Figure 13:
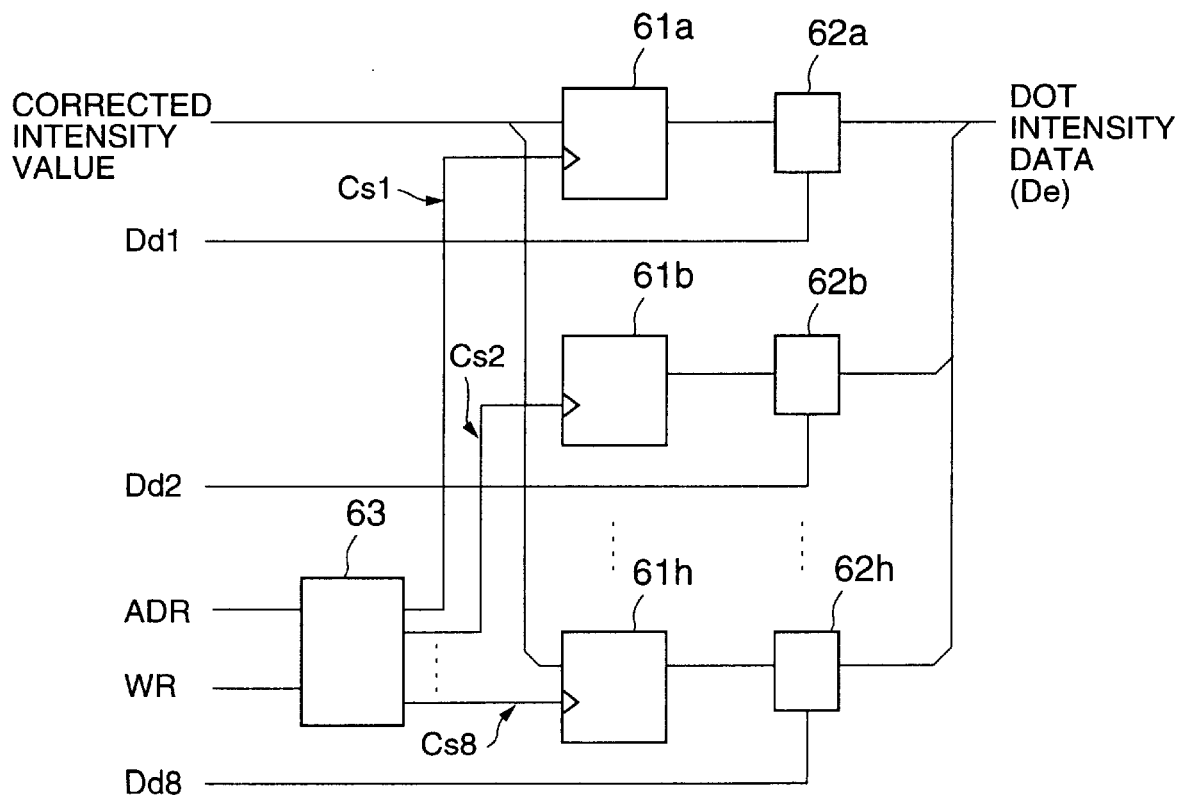
FIG. 13 is a circuit diagram of a data conversion unit of the imaging data generator in the first embodiment.

FIG. 13 shows a data conversion unit 60 of the imaging data generator 30 in the first embodiment.

In the present embodiment, the data conversion unit 60 converts the detection bits Dd1–Dd8, output by the pattern detection unit 50, into an 8-bit dot intensity data De, and outputs the dot intensity data De to the optical writing unit 80. At the same time, the data conversion unit 60 supplies the phase data Ds, output by the pattern detection unit 50, to the optical writing unit 80 without change. The dot intensity data De is used by the optical writing unit 80 to modulate the emission power and/or the emission time of the laser diode, so that the laser diode emits a laser beam to the photoconductive drum in accordance with the modulation data.

As shown in FIG. 13, the data conversion unit 60 includes flipflops 61a–61h having inputs connected to a data bus (the corrected intensity value) of the controller 70, 3-state buffers 62a–62h having inputs connected to the outputs of the flipflops 61a–61h as well as to the detection bit signals Dd1–Dd8 (or the outputs of the pattern detection unit 50), and an address decoder 63 having inputs connected to an address bus (ADR) of the controller 70 and to a write enable line (WR) of the controller 70.

As previously described, in the controller 70, the corrected intensity values for the dot intensity data De are predetermined in correspondence with the individual line/edge discrimination patterns held by the pattern detection unit 50. The corrected intensity value corresponding to the matched one of the line/edge discrimination patterns is supplied by the controller 70 and selected by the data conversion unit 60. Hence, the selection of appropriate corrected intensity values for the dot intensity data De can be achieved through the controller 70.

In the data conversion unit 60 of FIG. 13, specific addresses are assigned to the flipflops 61a–61h. The detection bit signals Dd1–Dd8 output by the pattern detection unit 50 are supplied to the 3-state buffers 62a–62h. The address decoder 63 generates chip-select signals Cs1–Cs8, indicative of one of the flipflops 61a–61h, by receiving an address signal ADR from the controller 70. When a write enable signal WR is supplied from the controller 70 to the address decoder 63, the address decoder 63 outputs the chip-select signals Cs1–Cs8 to the flipflops 61a–61h. Specifically, one of the chip-select signals Cs1–Cs8 is set to 1 with the others remaining 0, and one of the flipflops 61a–61h is made active with the others inactive. The corrected intensity value corresponding to the matched one of the line/edge discrimination patterns is supplied from the controller 70 to the data conversion unit 60. The active flipflop (the one of the flipflops 61a–61h) retains the corrected intensity value, and outputs it to the corresponding one of the 3-state buffers 62a–62h. This 3-state buffer outputs the corrected intensity value to the optical writing unit 80 as the dot intensity data De.

In the present embodiment of the image forming system, the optical writing unit 80 uses the dot intensity data De and the phase data Ds, output by the imaging data generator 30, to modulate the emission power (laser power modulation) and/or the emission time (pulse width modulation) of the laser diode of the optical writing unit 80. The optical writing unit 80 determines the start position of the laser beam emission per dot based on the phase data Ds, and determines the quantity of the emission laser beam per dot based on the dot intensity data De, so that the laser diode emits the laser beam to the photoconductive drum in accordance with the modulation data.

When the pattern detection unit 50 determines that the intensity pattern (Dc1–Dc3) matches one of the line/edge discrimination patterns, the data conversion unit 60 outputs the corrected intensity value to the optical writing unit 80 as the dot intensity data De. Therefore, the present embodiment of the image forming system is effective in achieving good reproductivity of a 1-pixel-thick vertical line for a resulting multilevel image.

Further, when there is a match between the intensity pattern and one of the discrimination patterns, the data conversion unit 60 outputs the high-state phase data Ds (the right-aligned mode) to the optical writing unit 80. In this case, the right-aligned mode is selected at the optical writing unit 80 for the subject pixel, and the laser beam emission by the laser diode with respect to the dot corresponding to the subject pixel is started from the right edge of the dot. When there is no match, the left-aligned mode is selected at the optical writing unit 80 for the subject pixel, and the laser beam emission by the laser diode with respect to the dot corresponding to the subject pixel is started from the left edge of the dot. Therefore, the present embodiment of the image forming system is effective in achieving good reproductivity of a multipixel-thick line edge for a resulting multilevel image.

Next, a description will be given of the advantages of the first embodiment of the image forming system, with reference to FIG. 14A through FIG. 14D and FIG. 15A through FIG. 15D.

FIG. 14A shows an input image having a 1-pixel-thick vertical black line and a 1-pixel-thick horizontal black line which cross each other at the center thereof. FIG. 14B shows a bitmap of the digital image signal Db at the output of the image processing unit 20 which is created from the input image of FIG. 14A. Each pixel in this bitmap has two bits indicating an intensity of a corresponding dot in a resulting multilevel image. Theoretically, the maximum intensity level (e.g., 255 in the case of an 8-bit-per-pixel multilevel image) is assigned to the bits of the dot intensity data corresponding to the black dot "11". The diameter of the laser beam emitted by the laser diode is usually larger than the dot size.

FIG. 14C shows a copy image produced from the input image of FIG. 14A by the conventional image forming system. In the copy image of FIG. 14C, the 1-pixel-thick vertical black line will be too broad. Further, in the copy image of FIG. 14C, the 1-pixel-thick vertical line is usually broader than the 1-pixel-thick horizontal line. This is inherently caused by the laser beam profile in the electrophotographic process.

FIG. 14D shows a copy image produced from the input image of FIG. 14A by the present embodiment of the image forming system. As the pattern detection unit 50 determines that the intensity pattern related to the subject pixel and its neighboring pixels (corresponding to the 1-pixel-thick vertical line of the input image) matches either the pattern (0,0,1,1,0,0) or the pattern (0,0,1,0,0,0), the value of the dot intensity data De of the subject pixel, corresponding to the black or gray dot forming the 1-pixel-thick vertical line, is reduced to 70–90% of the maximum intensity level. Therefore, the present embodiment of the image forming system is effective in achieving good reproductivity of the 1-pixel-thick vertical line for the resulting multilevel image. In addition, the present embodiment of the image forming system does not affect other areas of the resulting multilevel image than the 1-pixel-thick vertical line.

FIG. 15A shows an input image having edges of a 2-pixel-thick-line. FIG. 15B shows a bitmap of the digital image signal Db at the output of the image processing unit 20 which is created from the input image of FIG. 15A.

FIG. 15C shows a copy image produced from the input image of FIG. 15A by the conventional image forming system. The dot intensity data produced by the conventional image forming system does not take account of the dot phase or the start position of the laser beam emission per dot. In the conventional image forming system, the dot phase of the dot intensity data is fixed to the left-aligned mode (or the centered mode) for all the black or gray dots with respect to the copy-image of FIG. 15C. This causes the 2-pixel-thick line for the input image of FIG. 15A to become the two vertical black lines separated by a too-narrow vertical white line. In the case of the conventional image forming system, the reproductivity of the multipixel-thick line edge will be degraded as shown in FIG. 15C.

FIG. 15D shows a copy image produced from the input image of FIG. 15A by the present embodiment of the image forming system. As the pattern detection unit 50 determines that the intensity pattern (corresponding to the vertical line of the input image) matches any of the pattern (1,1,1,1,0,0), the pattern (0,0,1,1,1,1), the pattern (1,1,1,0,0,0) or the pattern (0,0,1,0,1,1), the value of the dot intensity data De of the subject pixel, corresponding to the black or gray dot forming the multipixel-thick line edge, is reduced to 70–90% of the maximum intensity level. Therefore, the present embodiment of the image forming system is effective in achieving good reproductivity of a multipixel-thick line edge for the resulting multilevel image.

Further, the phase data Ds in which the bits of the dot related to the left edge (or the rising edge) of the multipixel-thick line are set to 1 (the right-aligned mode) and the bits of the dot related to the right edge (or the falling edge) of the multipixel-thick line is set to 0 (the left-aligned mode) is supplied from the data conversion unit 60 to the optical writing unit 80. Therefore, the present embodiment of the image forming system is effective in achieving good reproductivity of a multipixel-thick line edge for the resulting multilevel image.

Next, a description will now be given of a second embodiment of the image forming system of the present invention.

Figure 16:
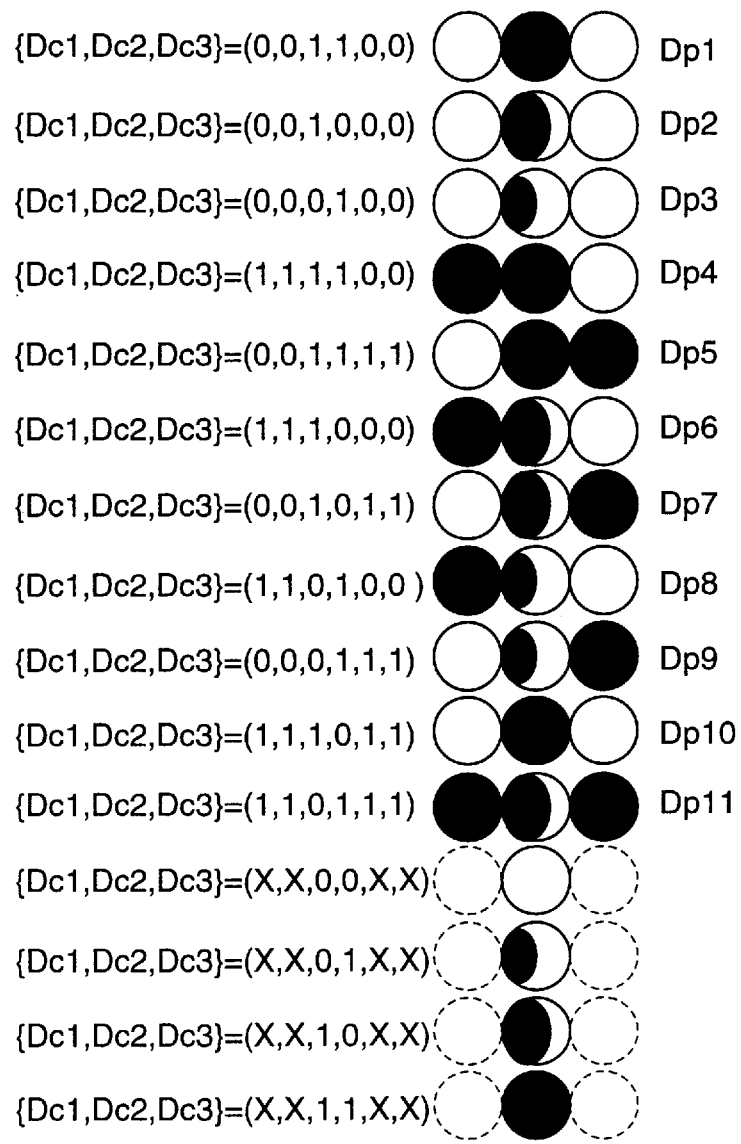
FIG. 16 is a diagram for explaining a plurality of line/edge discrimination patterns held by a pattern detection unit in a second embodiment of the image forming system of the present invention.

In the present embodiment, the pattern detection unit 50 of the imaging data generator 30 holds a plurality of line/edge discrimination patterns of FIG. 16 instead of the line/edge discrimination patterns of FIG. 7. Specifically, in the pattern detection unit 50 of the present embodiment, the upper eleven patterns of FIG. 16 are substituted for the upper six patterns of FIG. 7, and the lower four patterns of FIG. 16 which are the same as the lower four pattern of FIG. 7 are also held.

To minimize the hardware size, eleven of the line/edge discrimination patterns held by the pattern detection unit 50 in the present embodiment are configured to meet the requirements: (1) the neighboring pixels Dc1 and Dc3 indicate a white dot or a black dot; and (2) the subject pixel Dc2 indicates a black dot or a gray dot (one of the gray level 1 or the gray level 2). The upper eleven patterns of FIG. 16 are configured to meet these conditions.

Specifically, among the upper eleven patterns of FIG. 16, the first three patterns {Dc1,Dc2,Dc3}=(0,0,1,1,0,0), (0,0,1, 0,0,0) and (0,0,0,1,0,0) are to detect the presence of a 1-pixel-thick vertical line in the input image indicated by the image signal Db. Only the intensity of the subject pixel Dc2 for these patterns is different. The fourth through ninth patterns {Dc1,Dc2,Dc3}=(1,1,1,1,0,0), (0,0,1,1,1,1), (1,1,1, 0,0,0), (0,0,1,0,1,1), (1,1,0,1,0,0) and (0,0,0,1,1,1) are to detect the presence of a multipixel-thick line edge in the input image indicated by the image signal Db. The tenth and eleventh patterns {Dc1,Dc2,Dc3}=(1,1,1,0,1,1) and (1,1,0, 1,1,1) are to detect the presence of a 1-pixel-thick vertical white line in the input image indicated by the image signal Db.

The lower four patterns of FIG. 16 are the patterns {Dc1,Dc2,Dc3}=(X,X,0,0,X,X), (X,X,0,1,X,X), (X,X,1,0, X,X) and (X,X,1,1,X,X) where the bit "X" does not care whether it is 1 or 0 (i.e., the value "1" or the value "0" is allowed for the bit "X"). These patterns are used by the pattern detection unit 50 in the present embodiment so as to cover other states of the intensity pattern (Dc1–Dc3) than those covered by the upper eleven patterns of FIG. 16. Only the intensity of the subject pixel for the lower four patterns of FIG. 16 is different.

In the present embodiment, pattern matching bits Dp1–Dp11 corresponding to the upper eleven patterns of FIG. 16, indicated on the right side of FIG. 16, are output by respective pattern detectors of the pattern detection unit 50. When there is a match between the intensity pattern and one of the upper eleven patterns of FIG. 16 as a result of the pattern matching, only one of the pattern matching bits Dp1–Dp11 corresponding to the matched discrimination pattern is set to 1 and the other pattern matching bits remain 0. In the present embodiment, a correction bit Dd3 that is indicative of whether or not the intensity pattern matches one of the upper eleven patterns of FIG. 16, is added to the 2 bits indicative of the intensity of the subject pixel Dc2, and the pattern detection unit 50 supplies such detection bits Dd1–Dd3 (where Dd1+Dd2=Dc2) to the data conversion unit 60.

In the present embodiment of the image forming system, as a result of the pattern matching, the pattern detection unit 50 outputs the detection bits Dd1–Dd3 to the data conversion unit 60 by adding the correction bit (Dd3) to the 2 bits (Dc2) indicative of the intensity of the subject pixel. When there is a match as a result of the pattern matching, the correction bit Dd3 is set to 1, which notifies the data conversion unit 60 that the intensity pattern related to the subject pixel Dc2 and its neighboring pixels Dc1 and Dc3 matches one of the upper eleven patterns of FIG. 16. When there is not any match as a result of the pattern matching, the correction bit Dd3 is set to 0, which notifies the data conversion unit 60 that the intensity pattern does not match any of the upper eleven patterns of FIG. 16.

In addition, in the present embodiment, the pattern detection unit 50 generates a phase bit Ds based on a result of the pattern matching between the intensity pattern (related to the subject pixel Dc2 and its neighboring pixels Dc1 and Dc3) and predetermined ones of the upper eleven patterns of FIG. 16. When there is a match as the result of the pattern matching, the phase bit Ds is set to 1 (the right-aligned mode), which notifies the data conversion unit 60 that the right-aligned mode should be selected for the subject pixel Dc2. When there is no match as the result of the pattern matching, the phase bit Ds is set to 0 (the left-aligned mode), which notifies the data conversion unit 60 that the left-aligned mode is selected for the subject pixel Dc2. In this manner, the data conversion unit 60 determines a start position of the laser beam emission by the laser diode per dot based on the phase data. If the right-aligned mode is selected for the subject pixel, the laser beam emission by the laser diode with respect to the corresponding dot is started from the right edge of the dot. If the left-aligned mode is selected for the subject pixel, the laser beam emission by the laser diode with respect to the corresponding dot is started from the left edge of the dot.

In the present embodiment, the pattern detection unit 50 determines whether the intensity pattern (related to the subject pixel Dc2 and its neighboring pixels Dc1 and Dc3 output by the delay line 40) matches one of the upper eleven patterns of FIG. 16. The intensity pattern is represented by a series of bit signals Dc1(1), Dc1(0), Dc2(1), Dc2(0), Dc3(1) and Dc3(0) similar to that shown in FIG. 9. The pattern detection unit 50 is configured by suitably utilizing inverters, AND gates and OR gates so as to carry out the pattern matching. Based on the pattern matching, the pattern detection unit 50 outputs the detection bits Dd1–Dd3 to the data conversion unit 60 by adding the correction bit (Dd3) to the 2 bits (Dc2(1) and Dc2(0)) indicative of the intensity of the subject pixel.

Similar to the previously-described portion of the pattern detection unit of FIG. 9 in the previous embodiment, a pattern detector of the pattern detection unit 50 in the second embodiment which determines whether the intensity pattern matches the first pattern (0,0,1,1,0,0) of FIG. 16 is configured by using four inverters and an AND gate. When there is a match between the intensity pattern and the first pattern (0,0,1,1,0,0), the pattern matching bit Dp1 at the output of the AND gate is set to 1. Otherwise the pattern matching bit Dp1 is set to 0.

Similar to the above-described pattern detector of the pattern detection unit 50 in the present embodiment, other pattern detectors of the pattern detection unit 50 each of which determines whether the intensity pattern matches one of the other upper eleven patterns of FIG. 16 by appropriately arranging inverters and an AND gate. When there is a match between the intensity pattern (Dc1–Dc3) and the upper eleven patterns of FIG. 16 as a result of the pattern matching, only one of the pattern matching bits Dp1–Dp11 corresponding to the matched pattern is set to 1 and the other pattern matching bits remain 0.

Figure 17:
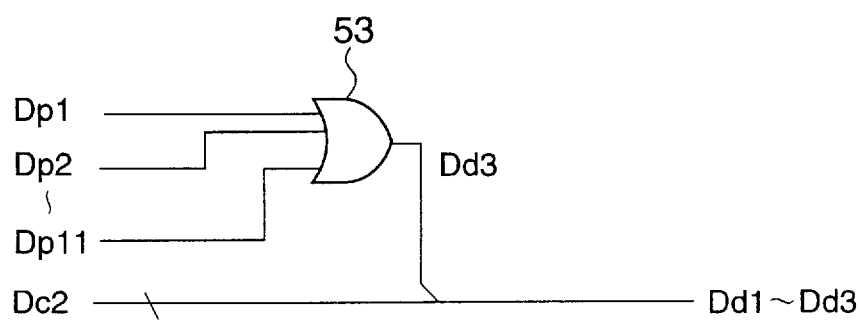
FIG. 17 is a circuit diagram of a portion of the pattern detection unit in the second embodiment.

FIG. 17 shows a portion of the pattern detection unit 50 in the second embodiment which outputs the detection bits Dd1–Dd3 to the data conversion unit 60 by adding the correction bit (Dd3) to the 2 bits (Dc2) indicative of the intensity of the subject pixel.

As shown in FIG. 17, the portion of the pattern detection unit 50 includes an OR gate 53 having inputs connected to the pattern matching bit signals Dp1–Dp11, and an output signal line connected to the output (Dd3) of the OR gate 53 as well as to the output (Dc2) of the flipflop 42 (see FIG. 3). When there is a match between the intensity pattern (Dc1–Dc3) matches one of the upper eleven patterns of FIG. 16, the correction bit signal Dd3 at the output of the OR gate 53 is set to 1. Otherwise the correction bit signal Dd3 at the output of the OR gate 53 is set to 0. The correction bit signal Dd3 is added to the 2 bits indicative of the intensity of the subject pixel Dc2. Hence, the pattern detection unit 50 outputs the detection bits Dd1–Dd3 (where Dd1+Dd2=Dc2) to the data conversion unit 60.

Figure 18:
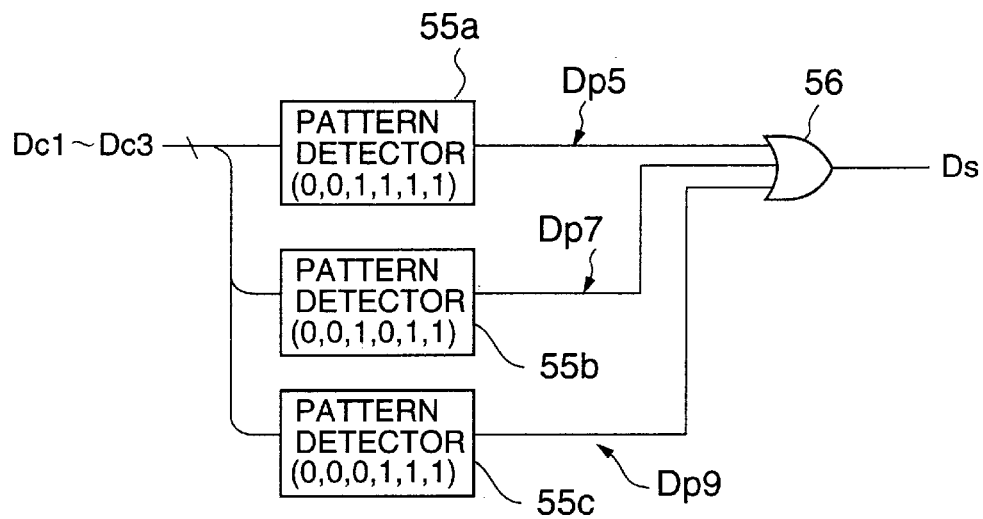
FIG. 18 is a circuit diagram of another portion of the pattern detection unit in the second embodiment.

FIG. 18 shows a portion of the pattern detection unit 50 in the second embodiment which generates a phase data Ds based on a result of the pattern matching between the intensity pattern (related to the subject pixel Dc2 and its neighboring pixels Dc1 and Dc3) and predetermined ones of the upper eleven patterns of FIG. 16.

In the present embodiment, a 1-bit phase bit signal Ds is generated by the pattern detection unit 50 based on the intensity pattern of the bit signals Dc1–Dc3 output by the delay line 40. When the intensity pattern (Dc1–Dc3) matches one of the fifth pattern (0,0,1,1,1,1), the seventh pattern (0,0,1,0,1,1) or the ninth pattern (0,0,0,1,1,1) of FIG. 16, the phase bit signal Ds at the output of the pattern detection unit 50 is set to 1 (the right-aligned mode). Otherwise the phase bit signal Ds is set to 0 (the left-aligned mode).

As shown in FIG. 18, the portion of the pattern detection unit 50 includes a pattern detector 55a having inputs connected to the bit signals Dc1–Dc3, a pattern detector 55b having inputs connected to the bit signals Dc1–Dc3, and a pattern detector 55c having inputs connected to the bit signals Dc1–Dc3. The pattern detector 55a outputs a pattern matching bit signal Dp5 based on the result of pattern matching between the intensity pattern and the fifth pattern (0,0,1,1,1,1) of FIG. 16. The pattern detector 55b outputs a pattern matching bit signal Dp7 based on the result of pattern matching between the intensity pattern and the seventh pattern (0,0,1,0,1,1) of FIG. 16. The pattern detector 55c outputs a pattern matching bit signal Dp9 based on the result of pattern matching between the intensity pattern and the ninth pattern (0,0,0,1,1,1) of FIG. 16.

The portion of the pattern detection unit 50 of FIG. 18 further includes an OR gate 56 having inputs connected to the pattern matching bit signals Dp5, Dp7 and Dp9 output by the pattern detectors 55a, 55b and 55c. The phase bit signal Ds is output by the OR gate 56 based on the logical inclusion of the results of the pattern matching executed by the pattern detectors 55a, 55b and 55c. The portion of the pattern detection unit 50 of FIG. 18 is configured to determine whether the intensity pattern matches one of the fifth pattern (0,0,1,1,1,1), the seventh pattern (0,0,1,0,1,1) or the ninth pattern (0,0,0,1,1,1) of FIG. 16. When there is a match, the phase bit signal Ds at the output of the OR gate 56 is set to 1 (the right-aligned mode). Otherwise the phase bit signal Ds is set to 0 (the left-aligned mode).

Figure 19:
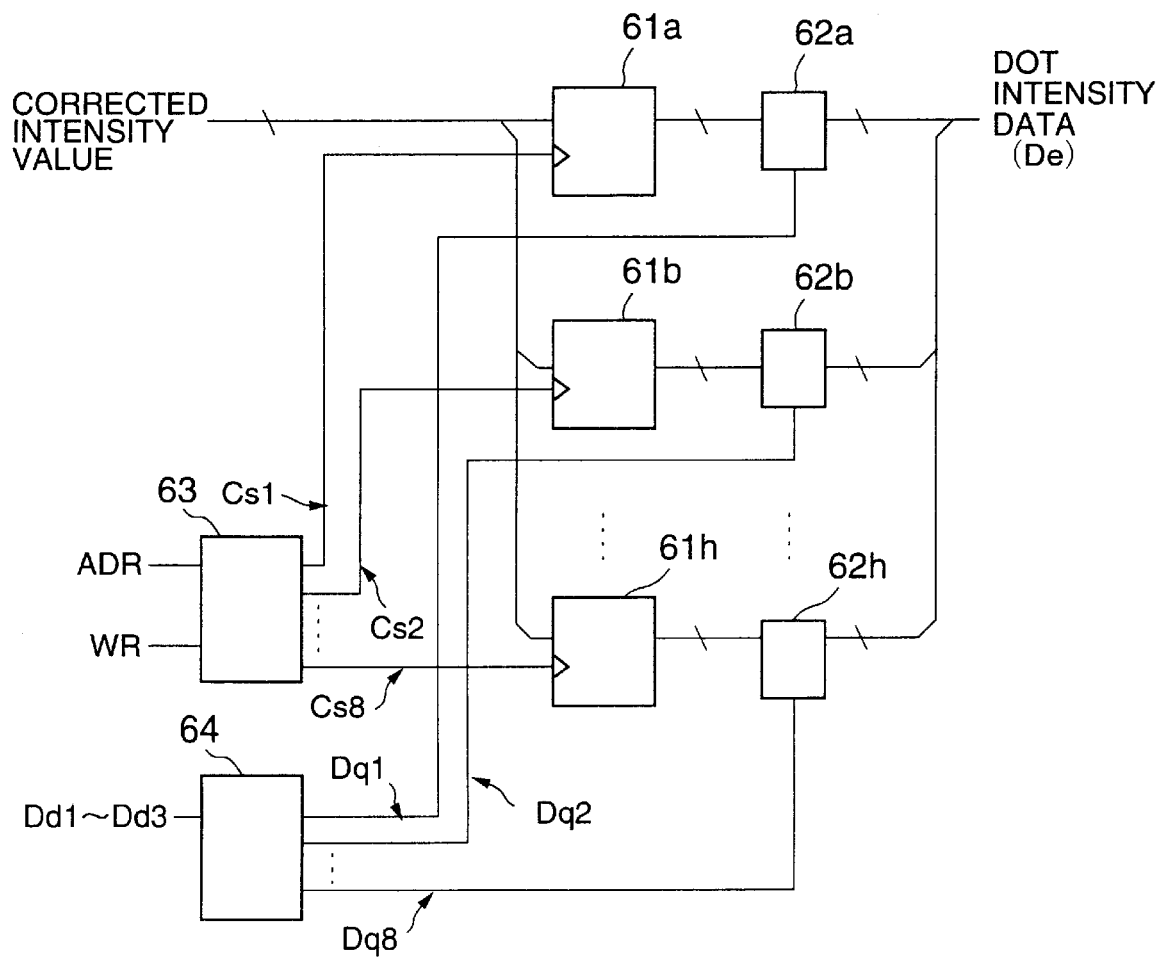
FIG. 19 is a circuit diagram of a data conversion unit in the second embodiment.

FIG. 19 shows a data conversion unit 60 in the second embodiment.

In the present embodiment, the data conversion unit 60 converts the detection bits Dd1–Dd3, output by the pattern detection unit 50, into an 8-bit dot intensity data De, and outputs the dot intensity data De to the optical writing unit 80. At the same time, the data conversion unit 60 supplies the phase data Ds, output by the pattern detection unit 50, to the optical writing unit 80 without change. The dot intensity data De is used by the optical writing unit 80 to modulate the emission power and/or the emission time of the laser diode, so that the laser diode emits a laser beam to the photoconductive drum in accordance with the modulation data.

As shown in FIG. 19, the data conversion unit 60 includes flipflops 61a–61h having inputs connected to a data bus (the corrected intensity value) of the controller 70, 3-state buffers 62a–62h having inputs connected to the outputs of the flipflops 61a–61h as well as to outputs of an address decoder 64, an address decoder 63 having inputs connected to an address bus (ADR) of the controller 70 and to a write enable line (WR) of the controller 70, and the address decoder having inputs connected to the detection bit signals Dd1–Dd3 (see FIG. 17) at the output of the pattern detection unit 50.

Similar to the previous embodiment, in the controller 70 in the second embodiment, the corrected intensity values for the dot intensity data De are predetermined in correspondence with the individual line/edge discrimination patterns held by the pattern detection unit 50. The corrected intensity value corresponding to the matched discrimination pattern is supplied by the controller 70 and selected by the data conversion unit 60. Hence, the selection of appropriate corrected intensity values for the dot intensity data De can be achieved through the controller 70.

In the data conversion unit 60 of FIG. 19, specific addresses are assigned to the flipflops 61a–61h. The detection bit signals Dd1–Dd3 output by the pattern detection unit 50 are supplied to the address decoder 64. The address decoder 63 generates chip-select signals Cs1–Cs8, indicative of one of the flipflops 61a–61h, by receiving an address signal ADR from the controller 70. When a write enable signal WR is supplied from the controller 70 to the address decoder 63, the address decoder 63 outputs the chip-select signals Cs1–Cs8 to the flipflops 61a–61h. Specifically, one of the chip-select signals Cs1–Cs8 is set to 1 with the others remaining 0, and one of the flipflops 61a–61h is made active with the others inactive. The corrected intensity value corresponding to the matched discrimination pattern is supplied from the controller 70 to the data conversion unit 60. The active flipflop (the one of the flipflops 61a–61h) retains the corrected intensity value, and outputs it to the corresponding one of the 3-state buffers 62a–62h. The address decoder 64 generates output-enable signals Dq1–Dq8, indicative of one of the 3-state buffers 62a–62h, by receiving the detection bit signals Dd1–Dd3 from the pattern detection unit 50. The active 3-state buffer outputs the corrected intensity value or the subject pixel intensity value to the optical writing unit 80 as the dot intensity data De.

In the present embodiment of the image forming system, the optical writing unit 80 uses the dot intensity data De and the phase data Ds, output by the imaging data generator 30, to modulate the emission power (laser power modulation) and/or the emission time (pulse width modulation) of the laser diode of the optical writing unit 80. The optical writing unit 80 determines the start position of the laser beam emission per dot based on the phase data Ds, and determines the quantity of the emission laser beam per dot based on the dot intensity data De, so that the laser diode emits the laser beam to the photoconductive drum in accordance with the modulation data.

When the pattern detection unit 50 determines that the intensity pattern (Dc1–Dc3) matches one of the line/edge discrimination patterns (the upper eleven patterns of FIG. 16), the data conversion unit 60 outputs the corrected intensity value to the optical writing unit 80 as the dot intensity data De. Therefore, the present embodiment of the image forming system is effective in achieving good reproductivity of a 1-pixel-thick vertical line for a resulting multilevel image.

Further, when there is a match between the intensity pattern and the predetermined ones of the discrimination patterns, the data conversion unit 60 outputs the high-state phase data Ds (the right-aligned mode) to the optical writing unit 80. In this case, the right-aligned mode is selected at the optical writing unit 80 for the subject pixel, and the laser beam emission by the laser diode with respect to the corresponding dot is started from the right edge of the dot. When there is no match, the left-aligned mode is selected at the optical writing unit 80 for the subject pixel, and the laser beam emission by the laser diode with respect to the corresponding dot is started from the left edge of the dot. Therefore, the present embodiment of the image forming system is effective in achieving good reproductivity of a multipixel-thick line edge for a resulting multilevel image.

Similar to the previous embodiment described with reference to FIG. 14A through FIG. 14D, the pattern detection unit 50 in the second embodiment determines that the intensity pattern related to the subject pixel and its neighboring pixels (corresponding to the 1-pixel-thick vertical line of the input image) matches one of the pattern (0,0,1,1,0,0), the pattern (0,0,1,0,0,0) or the pattern (0,0,0,1,0,0). The value of the dot intensity data De of the subject pixel, corresponding to the black or gray dot forming the 1-pixel-thick vertical line, is reduced to 70–90% of the maximum intensity level. Therefore, the present embodiment of the image forming system is effective in achieving good reproductivity of the 1-pixel-thick vertical line for the resulting multilevel image as shown in FIG. 14D. In addition, the present embodiment of the image forming system does not affect other areas of the resulting multilevel image than the 1-pixel-thick vertical line.

Similar to the previous embodiment described with reference to FIG. 15A through FIG. 15D, the pattern detection unit 50 in the second embodiment determines that the intensity pattern (corresponding to the vertical line of the input image) matches any of the patterns (1,1,1,1,0,0), (0,0,1,1,1,1), (1,1,1,0,0,0), (0,0,1,0,1,1), (1,1,0,1,0,0) or (0,0,0,1,1,1). The value of the dot intensity data De of the subject pixel, corresponding to the black or gray dot forming the multipixel-thick line edge, is reduced to 70–90% of the maximum intensity level. Therefore, the present embodiment of the image forming system is effective in achieving good reproductivity of a multipixel-thick line edge for the resulting multilevel image.

Further, the phase data Ds in which the bits of the dot related to the left edge (or the rising edge) of the multipixel-thick line are set to 1 (the right-aligned mode) and the bits of the dot related to the right edge (or the falling edge) of the multipixel-thick line are set to 0 (the left-aligned mode) is supplied from the data conversion unit 60 to the optical writing unit 80. Therefore, the present embodiment of the image forming system is effective in achieving good reproductivity of a multipixel-thick line edge for the resulting multilevel image.

The present invention is not limited to the above-described embodiments, and variations and modifications may be made without departing from the scope of the present invention.

Further, the present invention is based on Japanese priority application No.10-260079, filed on Sep. 14, 1998, the entire contents of which are hereby incorporated by reference.

What is claimed is:

1. An image forming system which forms an electrostatic image on a photoconductive medium by scanning a laser beam across the photoconductive medium in order to create a multilevel image on a copy sheet from the electrostatic image through an electrophotographic process, comprising:

an imaging data generator configured to generate a dot intensity data from each of a series of pixels contained in an input image, each pixel having bits indicative of an intensity of the pixel only, the imaging data generator including a plurality of discrimination patterns to detect the presence of one of a 1-pixel-thick vertical line and a multipixel-thick line edge in the input image; and an optical writing unit having a laser diode, configured to modulate at least one of an emission power and an emission time of the laser diode by using the dot intensity data output by the imaging data generator, and to determine the emission power of the laser beam per dot based on the dot intensity data, so that the laser diode emits the laser beam to the photoconductive medium in accordance with the modulation data, renders the 1-pixel-thick vertical line compatible in width with a 1-pixel-thick horizontal line, and renders the multi-pixel-thick line as a single multi-pixel-thick line without an intermediary channel of contrasting color, wherein corrected intensity values for the dot intensity data are predetermined in correspondence with the individual discrimination patterns, and when an intensity pattern related to a subject pixel and neighboring pixels thereof matches one of the discrimination patterns, the imaging data generator selects a corrected intensity value corresponding to the matched discrimination pattern as the dot intensity data, and when the intensity pattern does not match any of the discrimination patterns, the imaging data generator selects the intensity of the subject pixel as the dot intensity data.

2. The image forming system according to claim 1, wherein the imaging data generator generates a phase data based on a result of the pattern matching between the intensity pattern and predetermined discrimination patterns, and the optical writing unit determines a start position of the laser beam emission per dot based on the phase data.

3. The image forming system according to claim 1, wherein the imaging data generator includes:

a delay line which delays the series of pixels along a main scan line to output the intensity pattern related to the subject pixel and the neighboring pixels; and a pattern detection unit, having the plurality of discrimination patterns, which determines whether the intensity pattern matches one of the plurality of discrimination patterns, and, based on the pattern matching, the pattern detection unit outputting a detection result including detection bits and a phase bit.

4. The image forming system according to claim 3, wherein the corrected intensity value which is supplied by the imaging data generator to the optical writing unit when the intensity pattern matches a predetermined one of the discrimination patterns is reduced from a maximum intensity level.

5. An image forming system which forms an electrostatic image on a photoconductive medium by scanning a laser beam across the photoconductive medium in order to create a multilevel image on a copy sheet from the electrostatic image through an electrophotographic process, comprising:

an imaging data generator configured to generate a dot intensity data from each of a series of pixels contained in an input image, each pixel having bits indicative of an intensity of the pixel only, the imaging data generator including a plurality of discrimination patterns to detect the presence of one of a 1-pixel-thick vertical line and a multipixel-thick line edge in the input image; and an optical writing unit having a laser diode, configured to modulate at least one of an emission power and an emission time of the laser diode by using the dot intensity data output by the imaging data generator, and to determine the emission power of the laser beam per dot based on the dot intensity data, so that the laser diode emits the laser beam to the photoconductive medium in accordance with the modulation data, renders the 1-pixel-thick vertical line compatible in width with a 1-pixel-thick horizontal line, and renders the multipixel-thick line as a single multi-pixel-thick line without an intermediary channel of contrasting color, wherein the imaging data generator includes a pattern detection unit which outputs detection bits by adding a correction bit to the bits indicative of the intensity of a subject pixel in the input image, the correction bit indicating whether or not an intensity pattern related to the subject pixel and neighboring pixels thereof matches one of the discrimination patterns.

6. The image forming system according to claim 5, wherein the imaging data generator generates a phase data based on a result of the pattern matching between the intensity pattern and predetermined discrimination patterns, and the optical writing unit determines a start position of the laser beam emission per dot based on the phase data.

7. The image forming system according to claim 5, wherein the imaging data generator includes a delay line which delays the series of pixels along a main scan line to output the intensity pattern related to the subject pixel and the neighboring pixels, and wherein the pattern detection unit holds the plurality of discrimination patterns and determines whether the intensity pattern matches one of the plurality of discrimination patterns, and, based on the pattern matching, the pattern detection unit outputting the detection bits.

8. The image forming system according to claim 7, wherein a value of the dot intensity data which is supplied by the imaging data generator to the optical writing unit when the intensity pattern matches a predetermined one of the discrimination patterns is reduced from a maximum intensity level.

9. An image forming system which forms an electrostatic image on a photoconductive medium by scanning a laser beam across the photoconductive medium in order to create a multilevel image on a copy sheet from the electrostatic image through an electrophotographic process, comprising:

imaging data generating means for generating a dot intensity data from each of a series of pixels contained in an input image, each pixel having bits indicative of an intensity of the pixel only, the imaging data generating means including a plurality of discrimination-patterns to detect the presence of one of a 1-pixel-thick vertical line and a multipixel-thick line edge in the input image; and optical writing means for modulating at least one of an emission power and an emission time of a laser diode by using the dot intensity data output by the imaging data generating means, and for determining the emission power of the laser beam per dot based on the dot intensity data, so that the laser diode emits the laser beam to the photoconductive medium in accordance with the modulation data, renders the 1-pixel-thick vertical line compatible in width with a 1-pixel-thick horizontal line, and renders the multi-pixel-thick line as a single multi-pixel-thick line without an intermediary channel of contrasting color, wherein corrected intensity values for the dot intensity data are predetermined in correspondence with the individual discrimination patterns, and when an intensity pattern related to a subject pixel and neighboring pixels thereof matches one of the discrimination patterns, the imaging data generating means selects a corrected intensity value corresponding to the matched discrimination pattern as the dot intensity data, and when the intensity pattern does not match any of the discrimination patterns, the imaging data generating means selects the intensity of the subject pixel as the dot intensity data.

10. The image forming system according to claim 9, wherein the imaging data generating means generates a phase data based on a result of the pattern matching between the intensity pattern and predetermined discrimination patterns, and the optical writing means determines a start position of the laser beam emission per dot based on the phase data.

11. The image forming system according to claim 9, wherein the imaging data generating means includes:

delay line means for delaying the series of pixels along a main scan line to output the intensity pattern related to the subject pixel and the neighboring pixels; and pattern detection means, having the plurality of discrimination patterns, for determining whether the intensity pattern matches one of the plurality of discrimination patterns, and, based on the pattern matching, the pattern detection means outputting a detection result including detection bits and a phase bit.

12. The image forming system according to claim 11, wherein the corrected intensity value which is supplied by the imaging data generating means to the optical writing means when the intensity pattern matches a predetermined one of the discrimination patterns is reduced from a maximum intensity level.

13. An image forming system which forms an electrostatic image on a photoconductive medium by scanning a laser beam across the photoconductive medium in order to create a multilevel image on a copy sheet from the electrostatic image through an electrophotographic process, comprising:

imaging data generating means for generating a dot intensity data from each of a series of pixels contained in an input image, each pixel having bits indicative of an intensity of the pixel only, the imaging data generating means including a plurality of discrimination-patterns to detect the presence of one of a 1-pixel-thick vertical line and a multipixel-thick line edge in the input image; and optical writing means for modulating at least one of an emission power and an emission time of a laser diode by using the dot intensity data output by the imaging data generating means, and for determining the emission power of the laser beam per dot based on the dot intensity data, so that the laser diode emits the laser beam to the photoconductive medium in accordance with the modulation data, renders the 1-pixel-thick line compatible in width with a 1-pixel-thick horizontal line, and renders the multi-pixel-thick line as a single multi-pixel-thick vertical line without an intermediary channel of contrasting color, wherein the imaging data generating means includes pattern detection means which outputs detection bits by adding a correction bit to the bits indicative of the intensity of a subject pixel in the input image, the correction bit indicating whether or not an intensity pattern related to the subject pixel and neighboring pixels thereof matches one of the discrimination patterns.

14. The image forming system according to claim 13, wherein the imaging data generating means generates a phase data based on a result of the pattern matching between the intensity pattern and predetermined discrimination patterns, and the optical writing means determines a start position of the laser beam emission per dot based on the phase data.

15. The image forming system according to claim 13, wherein the imaging data generating means includes delay line means which delays the series of pixels along a main scan line to output the intensity pattern related to the subject pixel and the neighboring pixels, and the pattern detection means holds the plurality of discrimination patterns and determines whether the intensity pattern matches one of the plurality of discrimination patterns, and, based on the pattern matching, the pattern detection means outputting the detection bits.

16. The image forming system according to claim 15, wherein a value of the dot intensity data which is supplied by the imaging data generating means to the optical writing means when the intensity pattern matches a predetermined one of the discrimination patterns is reduced from a maximum intensity level.

* * * * *